US012350804B2

(12) United States Patent
Takeuchi et al.

(10) Patent No.: US 12,350,804 B2
(45) Date of Patent: Jul. 8, 2025

(54) POWER TOOL HAVING A HAMMER MECHANISM

(71) Applicant: MAKITA CORPORATION, Anjo (JP)

(72) Inventors: Hajime Takeuchi, Anjo (JP); Masanori Furusawa, Anjo (JP)

(73) Assignee: MAKITA CORPORATION, Anjo (JP)

( * ) Notice: Subject to any disclaimer, the term of this patent is extended or adjusted under 35 U.S.C. 154(b) by 4 days.

(21) Appl. No.: 18/216,166

(22) Filed: Jun. 29, 2023

(65) Prior Publication Data

US 2024/0017390 A1 Jan. 18, 2024

(30) Foreign Application Priority Data

Jul. 14, 2022 (JP) ................................ 2022-112847

(51) Int. Cl.
*B25D 17/24* (2006.01)
*B25D 17/04* (2006.01)
*B25D 17/06* (2006.01)

(52) U.S. Cl.
CPC ........... *B25D 17/043* (2013.01); *B25D 17/06* (2013.01); *B25D 17/24* (2013.01); *B25D 2222/57* (2013.01); *B25D 2250/095* (2013.01); *B25D 2250/121* (2013.01); *B25D 2250/241* (2013.01)

(58) Field of Classification Search
CPC ...... B25D 17/043; B25D 17/06; B25D 17/24; B25D 2222/57; B25D 2250/095; B25D 2250/121; B25D 2250/241; B25D 17/00
USPC ........ 173/81, 90, 140–141, 162.1, 197, 198, 173/213, 168–171
See application file for complete search history.

(56) References Cited

U.S. PATENT DOCUMENTS 4,401,167 A * 8/1983 Sekizawa ............. B25D 17/043 248/573
4,478,293 A * 10/1984 Weilenmann ........ B25D 17/043 173/162.2
4,800,965 A * 1/1989 Keller .................. B25D 17/043 267/140.13
5,692,574 A * 12/1997 Terada ................. B25D 17/043 173/162.2

(Continued)

FOREIGN PATENT DOCUMENTS

DE 102020128432 A1 * 5/2021 ............. B25D 11/12
JP 2010-247239 A 11/2010

*Primary Examiner* — Robert F Long
(74) *Attorney, Agent, or Firm* — Oliff PLC

(57) ABSTRACT

A power tool having a hammer mechanism includes a motor, a driving mechanism operably connected to the motor and configured to at least linearly drive a tool accessory along a driving axis, a tool body that houses the motor and the driving mechanism, an outer housing elastically connected to the tool body such that the outer housing at least partially covers the tool body and being slidable relative to the tool body in a first direction substantially parallel to the driving axis, a guide part configured to guide sliding movement of the outer housing relative to the tool body, and a handle including a grip part extending in a second direction, the handle being elastically connected at least to the outer housing and being movable relative to the outer housing in the first direction and in at least one direction that intersects the first direction.

8 Claims, 13 Drawing Sheets

(56) References Cited

U.S. PATENT DOCUMENTS

| | | | | | |
|---|---|---|---|---|---|
| 5,697,456 | A * | 12/1997 | Radle | B25D 17/043 | 173/162.2 |
| 6,148,930 | A * | 11/2000 | Berger | B25D 17/043 | 267/137 |
| 6,286,610 | B1 * | 9/2001 | Berger | B25F 5/006 | 173/162.1 |
| 7,100,706 | B2 * | 9/2006 | Meixner | B25F 5/006 | 173/162.1 |
| 7,921,935 | B2 * | 4/2011 | Engelfried | B25D 17/043 | 173/162.2 |
| 7,967,079 | B2 * | 6/2011 | Stierle | B25F 5/006 | 173/217 |
| 8,695,724 | B2 * | 4/2014 | Nakashima | B25F 5/006 | 173/210 |
| 8,985,236 | B2 * | 3/2015 | Wierer | B25D 17/24 | 173/162.1 |
| 9,168,652 | B2 * | 10/2015 | Schadow | B25F 5/006 | |
| 9,505,118 | B2 * | 11/2016 | Furusawa | B25D 17/24 | |
| 2005/0224244 | A1 * | 10/2005 | Kraenzler | B25F 5/026 | 173/162.1 |
| 2006/0289183 | A1 * | 12/2006 | Schreiber | B25F 5/02 | 173/162.2 |
| 2007/0289762 | A1 * | 12/2007 | Kikukchi | B25D 17/043 | 173/162.1 |
| 2007/0295521 | A1 * | 12/2007 | Wiker | B24B 23/028 | 173/162.1 |
| 2008/0202785 | A1 * | 8/2008 | Fischer | B25D 17/24 | 173/162.2 |
| 2009/0266571 | A1 * | 10/2009 | Baumann | B25F 5/026 | 173/162.2 |
| 2009/0283282 | A1 * | 11/2009 | Zimmermann | B25F 5/006 | 173/162.2 |
| 2010/0186979 | A1 * | 7/2010 | Krauter | B25F 5/006 | 29/527.1 |
| 2010/0206596 | A1 * | 8/2010 | Kamegai | B25F 5/026 | 16/431 |
| 2011/0011608 | A1 * | 1/2011 | Saur | B25D 11/062 | 173/162.2 |
| 2011/0100665 | A1 * | 5/2011 | Nakashima | B25F 5/026 | 173/162.2 |
| 2012/0031639 | A1 * | 2/2012 | Roberts | B25D 17/043 | 173/162.2 |
| 2012/0067605 | A1 | 3/2012 | Furusawa et al. | | |
| 2012/0160533 | A1 * | 6/2012 | Kamegai | B25D 17/20 | 173/162.2 |
| 2012/0279740 | A1 * | 11/2012 | Furusawa | B25D 17/24 | 173/79 |
| 2013/0025897 | A1 * | 1/2013 | Harcar | B25D 17/043 | 173/162.2 |
| 2015/0202762 | A1 * | 7/2015 | Roberts | B25D 17/043 | 173/162.2 |
| 2015/0202764 | A1 * | 7/2015 | Roberts | B25D 17/24 | 173/162.2 |
| 2017/0239803 | A1 * | 8/2017 | Aoki | B25F 5/008 | |
| 2022/0241950 | A1 * | 8/2022 | Machida | B25F 5/006 | |
| 2022/0331941 | A1 * | 10/2022 | Abe | B25D 17/043 | |

* cited by examiner

POWER TOOL HAVING A HAMMER MECHANISM

CROSS-REFERENCE TO RELATED APPLICATION

The present application claims priority to Japanese patent application No. 2022-112847 filed on Jul. 14, 2022, the contents of which are hereby fully incorporated herein by reference.

TECHNICAL FIELD

The present disclosure relates to a power tool having a hammer mechanism and configured to linearly drive a tool accessory by striking the tool accessory.

BACKGROUND

A power tool having a hammer mechanism is configured to perform a processing operation (e.g., chipping) on a workpiece by striking (hammering) a tool accessory to linearly drive the tool accessory along a driving axis. Therefore, large vibration is caused in the power tool during the processing operation. To cope with such vibration, various vibration isolating measures are known that reduce (suppress) transmission of vibration from a tool body to a handle of the power tool. For example, a power tool that is disclosed in Japanese non-examined laid-open patent publication No. 2010-247239 includes a hammer mechanism, an outer housing that is connected to a tool body via a first elastic member, and a handle that is connected to the outer housing via a second biasing member. The outer housing is movable relative to the tool body in a direction that intersects a longitudinal direction of a tool accessory, and the handle is movable relative to the outer housing in the longitudinal direction of the tool accessory.

SUMMARY

The above-described power tool can cope with vibration in the longitudinal direction of the tool accessory and vibration in the direction that intersects the longitudinal direction. This power tool, however, leaves room for further improvement.

It is accordingly a non-limiting object of the present disclosure to provide improvement relating to a vibration isolating structure of a power tool having a hammer mechanism.

A non-limiting aspect of the present disclosure herein provides a power tool having a hammer mechanism. The power tool includes a motor, a driving mechanism, a tool body, an outer housing, a guide part and a handle. The driving mechanism is operably connected to the motor and configured to at least linearly drive a tool accessory along a driving axis in response to driving of the motor. The tool body houses the motor and the driving mechanism. The outer housing is elastically connected to the tool body such that the outer housing at least partially covers the tool body. The outer housing is slidable relative to the tool body in a first direction that is substantially parallel to the driving axis. The guide part is configured to guide sliding movement of the outer housing relative to the tool body. The handle includes a grip part that extends in a second direction that intersects the first direction. The handle is elastically connected at least to the outer housing. The handle is movable relative to the outer housing in the first direction and in at least one direction that intersects the first direction.

The power tool according to this aspect includes the tool body, the outer housing and the handle. The largest and most dominant vibration is caused in the first direction substantially parallel to the driving axis when the tool accessory is driven along the driving axis. The tool body and the outer housing are elastically connected to each other such that the tool body and the outer housing are slidable relative to each other in the first direction. This structure can effectively reduce (suppress) transmission of the vibration in the first direction from the tool body to the outer housing. Further, the handle and the outer housing are elastically connected to each other to be movable relative to each other in the first direction. Therefore, even if the vibration in the first direction is transmitted from the tool body to the outer housing, this structure can reduce transmission of the vibration to the handle. This can effectively reduce transmission of the vibration in the first direction from the tool body to the handle. Further, the handle and the outer housing are elastically connected to be movable relative to each other also in at least one direction that intersects the first direction. Therefore, even if vibration in the at least one direction that intersects the first direction is transmitted from the tool body to the outer housing, this structure can reduce transmission of such vibration to the handle.

Another non-limiting aspect of the present disclosure herein provides a power tool having a hammer mechanism. The power tool includes a motor, a driving mechanism, a tool body, an outer housing, a guide part and a handle. The driving mechanism is operably connected to the motor and configured to at least linearly drive a tool accessory along a driving axis in response to driving of the motor. The tool body houses the motor and the driving mechanism. The outer housing is elastically connected to the tool body such that the outer housing at least partially covers the tool body. The outer housing is slidable relative to the tool body in a first direction that is substantially parallel to the driving axis. The guide part is configured to guide sliding movement of the outer housing relative to the tool body. The handle includes a grip part, a first end portion and a second end portion. The grip part extends in a second direction that intersects the first direction. The first end portion is connected to one end of the grip part. The second end portion is connected to the other end of the grip part. Each of the first end portion and the second end portion of the handle is elastically connected to the tool body or to the outer housing to be movable relative to the tool body or the outer housing at least in the first direction. At least one of the first end portion and the second end portion is elastically connected to the outer housing.

The power tool according to this aspect includes the tool body, the outer housing and the handle. The largest and most dominant vibration is caused in the first direction that is substantially parallel to the driving axis when the tool accessory is driven along the driving axis. The tool body and the outer housing are elastically connected to be slidable relative to each other in the first direction. This structure can effectively reduce transmission of vibration in the first direction from the tool body to the outer housing. Further, each of the first end portion and the second end portion of the handle is elastically connected to the tool body or to the outer housing to be movable relative to the tool body or the outer housing in the first direction. This structure can effectively reduce the possibility that the vibration in the first direction is transmitted from the tool body to the handle directly or via the outer housing.

DETAILED DESCRIPTION OF THE EMBODIMENTS

Figure 1:
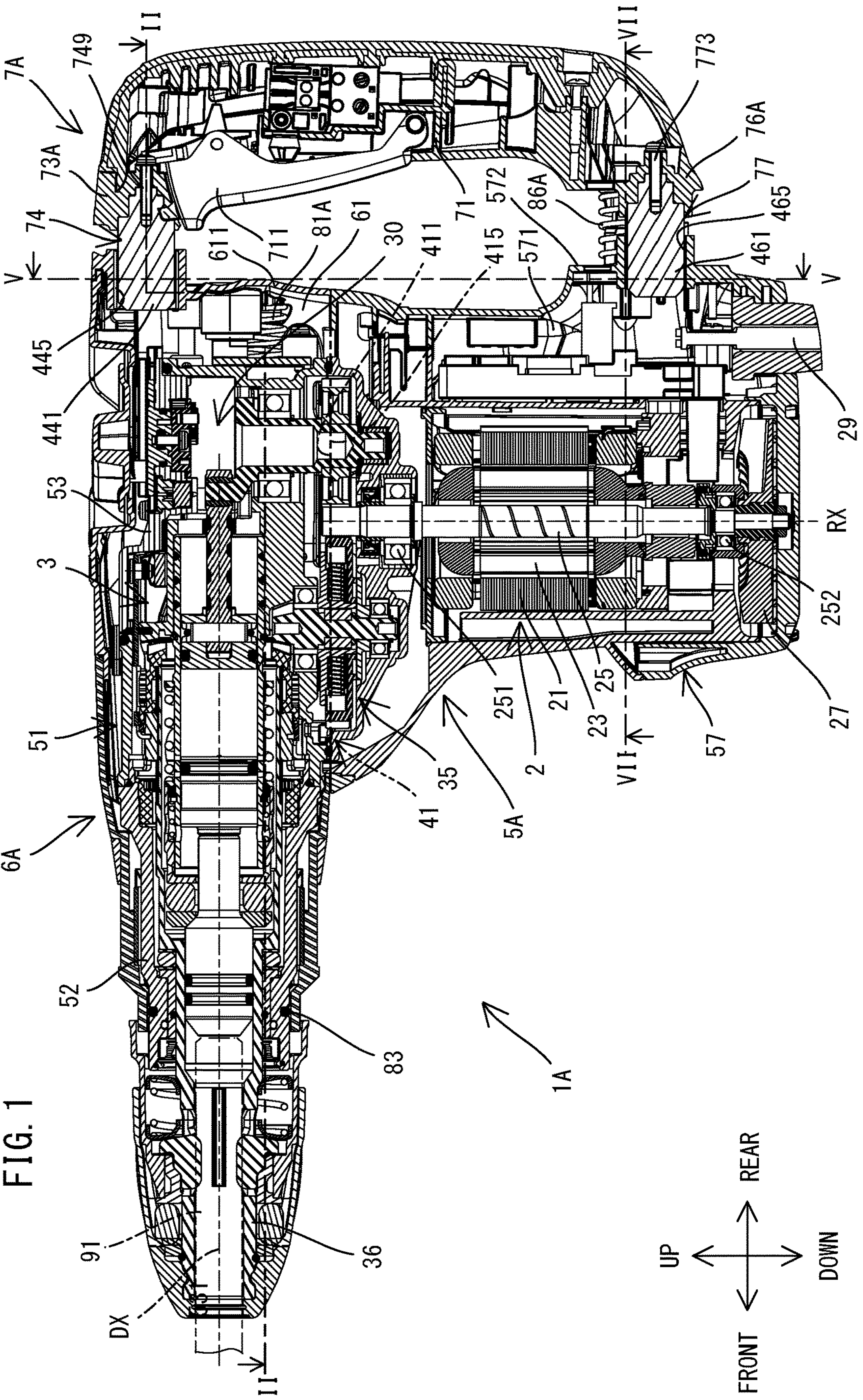
FIG. 1 is a sectional view of a rotary hammer according to a first embodiment.

In one non-limiting embodiment according to the present disclosure, the outer housing may be movable relative to the tool body in at least one direction that intersects the first direction. According to this embodiment, transmission of vibration in the at least one direction that intersects the first direction from the tool body to the outer housing can be reduced, so that the vibration isolating effect is enhanced.

In addition or in the alternative to the preceding embodiment, the tool body and the outer housing may be (i) connected via a first elastic member to be movable relative to each other in the first direction, and (ii) connected via a second elastic member that is different from the first elastic member to be movable relative to each other in the at least one direction that intersects the first direction. According to this embodiment, a rational structure of connecting the tool body and the outer housing is provided that can cope with the vibration in multiple directions by utilizing the different first and second elastic members.

In addition or in the alternative to the preceding embodiments, the first elastic member may be a mechanical spring. The second elastic member may be rubber or elastic synthetic resin. Examples of the elastic synthetic resin may include elastomer and synthetic resin foam (e.g., urethane foam). According to this embodiment, the mechanical spring, which is suitable for isolating vibration in one (a single) direction is utilized to cope with the largest and most dominant vibration in the first direction, while the rubber or elastic synthetic resin, which can be freely designed in shape, is utilized to cope with vibration in other directions that is smaller than the vibration in the first direction.

In addition or in the alternative to the preceding embodiments, the outer housing and the handle may be (i) connected via a third elastic member to be movable relative to each other in the first direction, and (ii) connected via a fourth elastic member that is different from the third elastic member to be movable relative to each other in the at least one direction that intersects the first direction. According to this embodiment, a rational structure of connecting the outer housing and the handle is provided that can cope with the vibration in multiple directions by utilizing the different third and fourth elastic members.

In addition or in the alternative to the preceding embodiments, the third elastic member may be a mechanical spring. The fourth elastic member may be rubber or elastic synthetic resin. Examples of the elastic synthetic resin may include elastomer and synthetic resin foam (e.g., urethane foam). According to this embodiment, the mechanical spring, which is suitable for isolating vibration in one (a single) direction is utilized to cope with the largest and most dominant vibration in the first direction, while the rubber or elastic synthetic resin, which can be freely designed in shape, is utilized to cope with vibration in other directions that is smaller than the vibration in the first direction.

In addition or in the alternative to the preceding embodiments, the outer housing and the handle may be connected via the fourth elastic member to be movable relative to each other in the second direction. The fourth elastic member may be supported by a support member. The support member may be configured to restrict movement of the handle relative to the outer housing in a third direction that is orthogonal to the first direction and the second direction. Although smaller than the vibration in the first direction, relatively large vibration may also be caused in the second direction when the tool accessory is driven. On the other hand, vibration in the third direction, which is orthogonal to the first and second directions, is relatively small. According to this embodiment, useless movement of the handle relative to the outer housing in the third direction can be reduced, while transmission of the vibration in the second direction to the handle is effectively reduced.

In addition or in the alternative to the preceding embodiments, the handle may include a first end portion and a second end portion. The first end portion may be connected to one end of the grip part that is located closer to the driving axis than the other end of the grip part in the second direction. The second end portion may be connected to the other end of the grip part. Each of the first end portion and the second end portion may be elastically connected to the tool body or to the outer housing to be movable in the first direction. At least one of the first end portion and the second end portion may be elastically connected to the outer housing. According to this embodiment, each the first and second end portions of the handle is movable in the first direction, so that transmission of the largest and most dominant vibration in the first direction to the handle can be effectively reduced.

In addition or in the alternative to the preceding embodiments, the first end portion may be elastically connected to the outer housing. The second end portion may be elastically connected to the tool body. According to this embodiment, the first end portion, which is closer to the driving axis in the handle, is elastically connected to the tool body via the outer housing so as to be movable relative to the outer housing in the first direction. Therefore, transmission of the largest and most dominant vibration in the first direction to the first end portion can be effectively reduced.

In addition or in the alternative to the preceding embodiments, each of the first end portion and the second end portion may be elastically connected to the tool body or to the outer housing via a mechanical spring. An initial load of the mechanical spring for the first end portion may be larger than an initial load of the mechanical spring for the second end portion. The power tool performs a processing operation while a tool accessory is pressed against a workpiece. According to this embodiment, pressing of the tool accessory against the workpiece can be stabilized by setting the initial load of the mechanical spring for the first end portion, which is closer to the driving axis, to be larger than that for the second end portion.

In addition or in the alternative to the preceding embodiments, each of the first end portion and the second end portion may be elastically connected to the tool body or to the outer housing via rubber or elastic synthetic resin to be movable in the first direction, the second direction and a third direction that is orthogonal to the first direction and the second direction. According to this embodiment, both the first and second end portions of the handle are movable in the first, second and third directions, so that the power tool can cope with vibration in various directions.

In addition or in the alternative to the preceding embodiments, the rubber or the elastic synthetic resin may be annular and may be disposed around a shaft extending in a third direction that is orthogonal to the first and second directions. According to this embodiment, each of the first and second end portions can be made movable relative to the tool body or to the outer housing in all directions that intersect the third direction utilizing a simple structure.

In addition or in the alternative to the preceding embodiments, the first end portion may be elastically connected to the tool body or to the outer housing via a mechanical spring. The second end portion may be pivotable relative to the tool body or the outer housing around an axis extending in a third direction that is orthogonal to the first and second directions. According to this embodiment, transmission of the largest and most dominant vibration in the first direction to the first end portion can be effectively reduced by the mechanical spring, while the second end portion, which is farther from the driving axis, pivots relative to the tool body or the outer housing. First to third representative, non-limiting embodiments of the present disclosure are now specifically described with reference to the drawings. In the description of the second and third embodiments, elements, components and structures that are substantially identical to those of the first embodiment are given the same numerals as in the first embodiment and their illustration and description are appropriately omitted or simplified, and features that are different from those in the first embodiment are mainly described.

First Embodiment

A rotary hammer (hammer drill) 1A according to the first embodiment of the present disclosure is now described with reference to FIGS. 1 to 7. The rotary hammer 1A is described as an example of a power tool having a hammer mechanism. The rotary hammer 1A is configured to linearly reciprocate a tool accessory 91, which is removably mounted thereto, along a driving axis DX (such an action is hereinafter referred to as a hammering action). The rotary hammer 1A is also configured to rotationally drive the tool accessory 91 around the driving axis DX (such an action is hereinafter referred to as a rotary action).

First, the general structure of the rotary hammer 1A is described.

As shown in FIG. 1, the rotary hammer 1A includes a motor 2, a driving mechanism 3 that is driven by the motor 2 to drive the tool accessory 91, and a tool body 5A that houses the motor 2 and the driving mechanism 3.

In this embodiment, the motor 2 is arranged such that a rotational axis RX of a motor shaft 25 extends in a direction that intersects (more specifically, that is substantially orthogonal to) the driving axis DX. The tool body 5A includes a driving-mechanism-housing part 51 that houses the driving mechanism 3 and extends along the driving axis DX, and a motor-housing part 57 that houses the motor 2. The driving-mechanism-housing part 51 and the motor-housing part 57 are connected to each other such that driving-mechanism-housing part 51 and the motor-housing part 57 together forms a substantial L-shape. A tool holder 36 is disposed within one end portion of the driving-mechanism-housing part 51 in the extending direction of the driving axis DX. The tool accessory 91 is held by the tool holder 36 so as to be movable along the driving axis DX and not to be rotatable around the driving axis DX, relative to the tool holder 36.

Further, the rotary hammer 1A includes an outer housing 6A and a handle 7A. The outer housing 6A extends along the driving axis DX so as to cover the driving-mechanism-housing part 51 of the tool body 5A. The motor-housing part 57 of the tool body 5A is exposed to the outside without being covered by the outer housing 6A. The outer housing 6A is elastically connected to the tool body 5A to be movable relative to the tool body 5A. The handle 7A is U-shaped as a whole. One end portion of the handle 7A is elastically connected to the outer housing 6A, and the other end portion of the handle 7A is elastically connected to the tool body 5A (the motor-housing part 57). The handle 7A is movable relative to the tool body 5A and the outer housing 6A. "Being elastically connected" herein means "being connected via at least one elastic member".

The handle 7A includes an elongate grip part 71. The grip part 71 is arranged on an opposite side of the tool body 5A and the outer housing 6A from the tool accessory 91 in the extending direction of the driving axis DX. The grip part 71 extends in a direction that intersects the driving axis DX. In this embodiment, the extending direction of the grip part 71 is substantially parallel to the extending direction of the rotational axis RX of the motor 2. A switch lever 711 is provided at one longitudinal end portion of the grip part 71. The switch lever 711 is configured to be depressed by a user. When the switch lever 711 is depressed, the motor 2 is driven and the driving mechanism 3 drives the tool accessory 91 to thereby perform a processing operation (e.g., chipping and drilling).

The detailed structure of the rotary hammer 1A is now described. In the following description, for the sake of convenience, the extending direction of the driving axis DX (hereinafter also simply referred to as a driving-axis direction) is defined as a front-rear direction of the rotary hammer 1A. In the front-rear direction, the side on which the tool holder 36 is located is defined as the front side of the rotary hammer 1A, and the side on which the grip part 71 is located is defined as the rear side of the rotary hammer 1A. The longitudinal direction of the grip part 71 (which is also the extending direction of the rotational axis RX) is defined as an up-down direction of the rotary hammer 1A. In the up-down direction, the side on which the switch lever 711 is located is defined as an upper side, and the opposite side is defined as a lower side. A direction that is orthogonal to the front-rear direction and the up-down direction is defined as a left-right direction of the rotary hammer 1A.

The tool body 5A and elements (structures) disposed within the tool body 5A are now described.

As shown in FIG. 1, the tool body 5A includes the driving-mechanism-housing part 51 and the motor-housing part 57 that is connected to the driving-mechanism-housing part 51.

A front half of the driving-mechanism-housing part 51 has a generally circular cylindrical shape and is also referred to as a barrel 52. A rear half of the driving-mechanism-housing part 51 is a generally rectangular hollow body and is also referred to as a crank housing 53. The barrel 52 and the crank housing 53 are fixedly connected to each other with screws (not shown) in the front-rear direction into one piece (a single unit) and thereby form the driving-mechanism-housing part 51.

The driving-mechanism-housing part 51 houses the driving mechanism 3. The driving mechanism 3 is operably connected to the motor 2 (the motor shaft 25) and driven by power of the motor 2. The driving mechanism 3 of this embodiment incudes a hammer mechanism 30 for the hammering action and a rotation-transmitting mechanism 35 for the rotary action. The structures of the hammer mechanism 30 and the rotation-transmitting mechanism 35 are well-known, and therefore they are only briefly described below.

The hammer mechanism 30 includes a motion-converting mechanism and a striking element. The motion-converting mechanism is operably connected to the motor 2 and configured to convert rotation of the motor shaft 25 into linear motion and transmit it to the striking element. In this embodiment, a crank mechanism having a well-known structure, which includes a crank shaft and a piston, is employed as the motion-converting mechanism. The striking element is configured to linearly move to strike (hammer) the tool accessory 91 to thereby linearly drive the tool accessory 91 along the driving axis DX. In this embodiment, the striking element includes a striker and an impact bolt. When the motor 2 is driven, the piston reciprocatingly slides in the front-rear direction along the driving axis DX within a cylinder that is disposed within the driving-mechanism-housing part 51. The striking element is driven by action of an air spring in response to reciprocating movement of the piston and the impact bolt intermittently strikes the tool accessory 91.

The rotation-transmitting mechanism 35 is operably connected to the motor 2 and configured to transmit the rotational power of the motor shaft 25 to the tool holder 36. The rotation-transmitting mechanism 35 of this embodiment is a speed-reduction gear mechanism having a well-known structure, and the rotation of the motor 2 is appropriately decelerated and transmitted to the tool holder 36. When the motor 2 is driven, the rotation-transmitting mechanism 35 rotationally drives the tool holder 36 and the tool accessory 91 held by the tool holder 36 around the driving axis DX.

The rotary hammer 1A of this embodiment selectively operates in a first mode in which only the hammering action is performed or in a second mode in which the hammering action and the rotary action are performed at the same time. Any known structure may be employed as a structure for changing the mode, and therefore it is not described herein.

Figure 2:
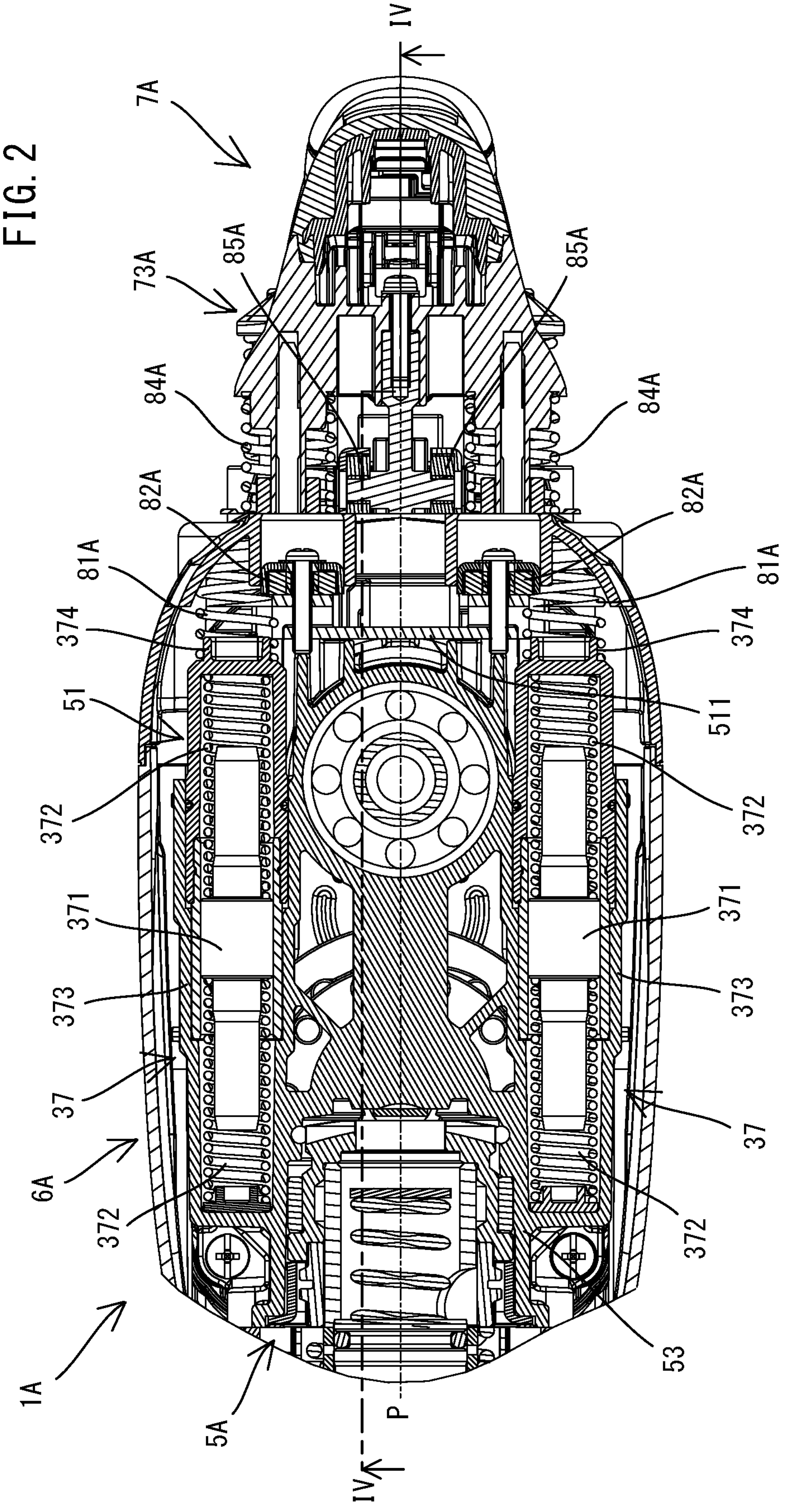
FIG. 2 is a sectional view taken along line II-11 in FIG. 1.

In this embodiment, as shown in FIG. 2, the driving-mechanism-housing part 51 has two dynamic vibration reducers 37 for absorbing vibration caused in the tool body 5A. The dynamic vibration reducers 37 are symmetrically arranged relative to an imaginary plane P that contains the driving axis DX and that is orthogonal to the left-right direction. The plane P passes the substantial center of the rotary hammer 1A in the left-right direction and that contains the driving axis DX and the rotational axis RX.

Each of the dynamic vibration reducers 37 has a weight 371, two springs 372 arranged on opposite sides of the weight 371, and a housing part 373 for housing the weight 371 and the springs 372. The weight 371 and the springs 372 are arranged within the housing part 373, which is integrally formed with the driving-mechanism-housing part 51 (the crank housing 53), such that the weight 371 is slidable in the front-rear direction under the biasing force of the springs 372. The dynamic vibration reducers 37 are each capable of effectively absorbing vibration caused in the front-rear direction during the hammering action.

As shown in FIG. 1, the motor-housing part 57 has a tubular shape having an open upper end and a closed lower end. The driving-mechanism-housing part 51 and the motor-housing part 57 are fixedly connected to each other with screws to form the tool body 5A, in a state in which a lower end portion of the driving-mechanism-housing part 51 is within an upper end portion of the motor-housing part 57.

The motor-housing part 57 houses the motor 2. The motor 2 of this embodiment is a brushed motor. The motor 2 is driven by power supplied from an external AC power supply via a power cord 29. The motor 2 has a stator 21, a rotor 23 and the motor shaft 25 that is configured to rotate together with the rotor 23. The motor shaft 25 extends in the up-down direction. Upper and lower end portions of the motor shaft 25 are rotatably supported by bearings 251, 252 that are supported by the tool body 5A.

A fan 27 is fixed around the lower end portion of the motor shaft 25. In this embodiment, the fan 27 is fixed around the motor shaft 25 below the bearing 252 and disposed within a lowermost end portion of the motor-housing part 57. The fan 27 is configured to rotate together with the motor shaft 25 and generate an air flow for cooling the motor 2 when the motor 2 is driven.

The structure of the outer housing 6A is now described.

As shown in FIG. 1, the outer housing 6A is configured to cover the driving-mechanism-housing part 51 of the tool body 5A. More specifically, a front half of the outer housing 6A has a tubular shape and covers the front half (the barrel 52) of the driving-mechanism-housing part 51. A rear half of the outer housing 6A has a rectangular box-like shape having an open lower end and covers the rear half (the crank housing 53) of the driving-mechanism-housing part 51. A lower end portion of a peripheral wall 61 of the rear half of the outer housing 6A is configured to conform to a peripheral wall 571 of the motor-housing part 57.

Figure 3:
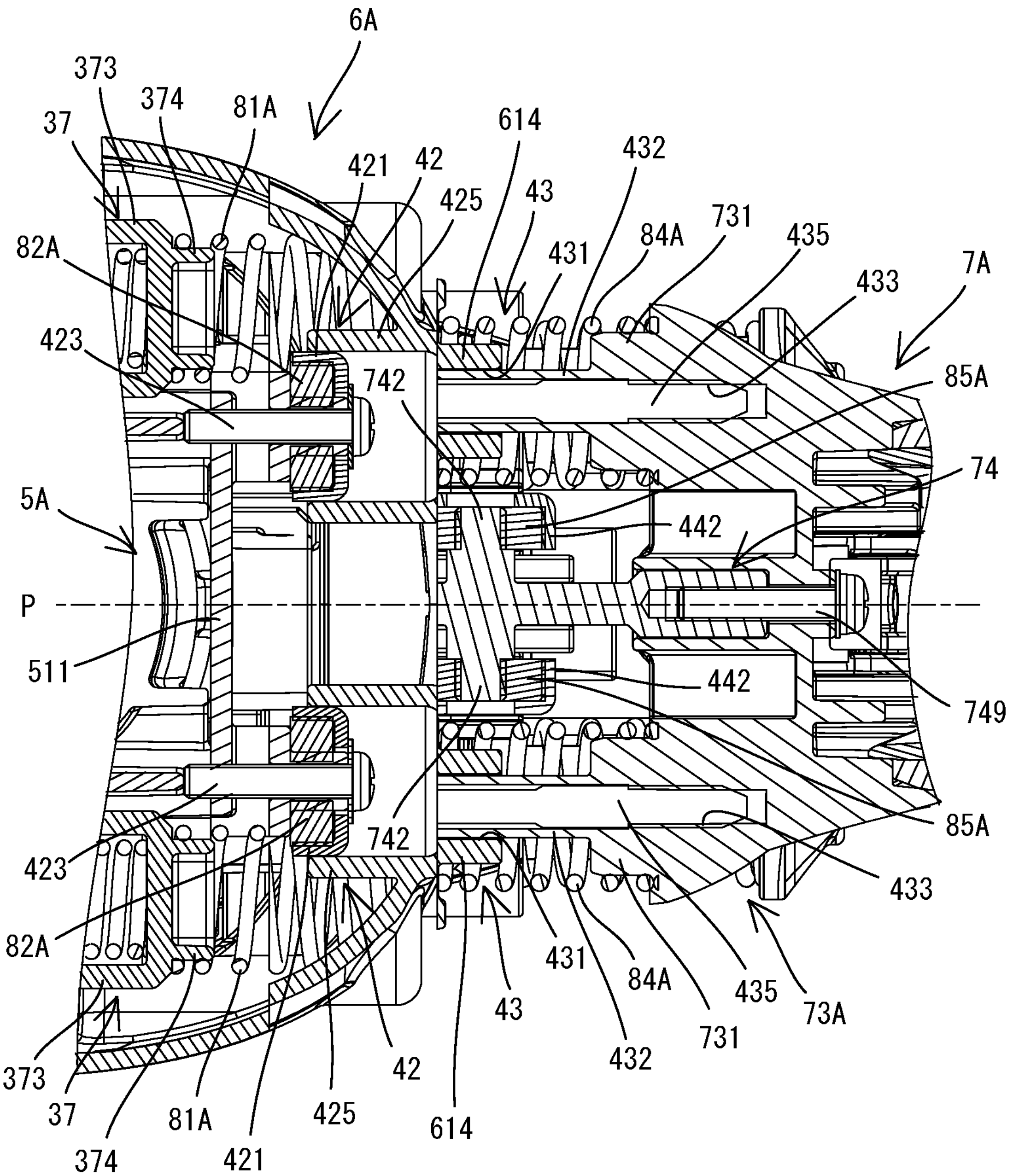
FIG. 3 is a partial, enlarged view of FIG. 2.
Figure 4:
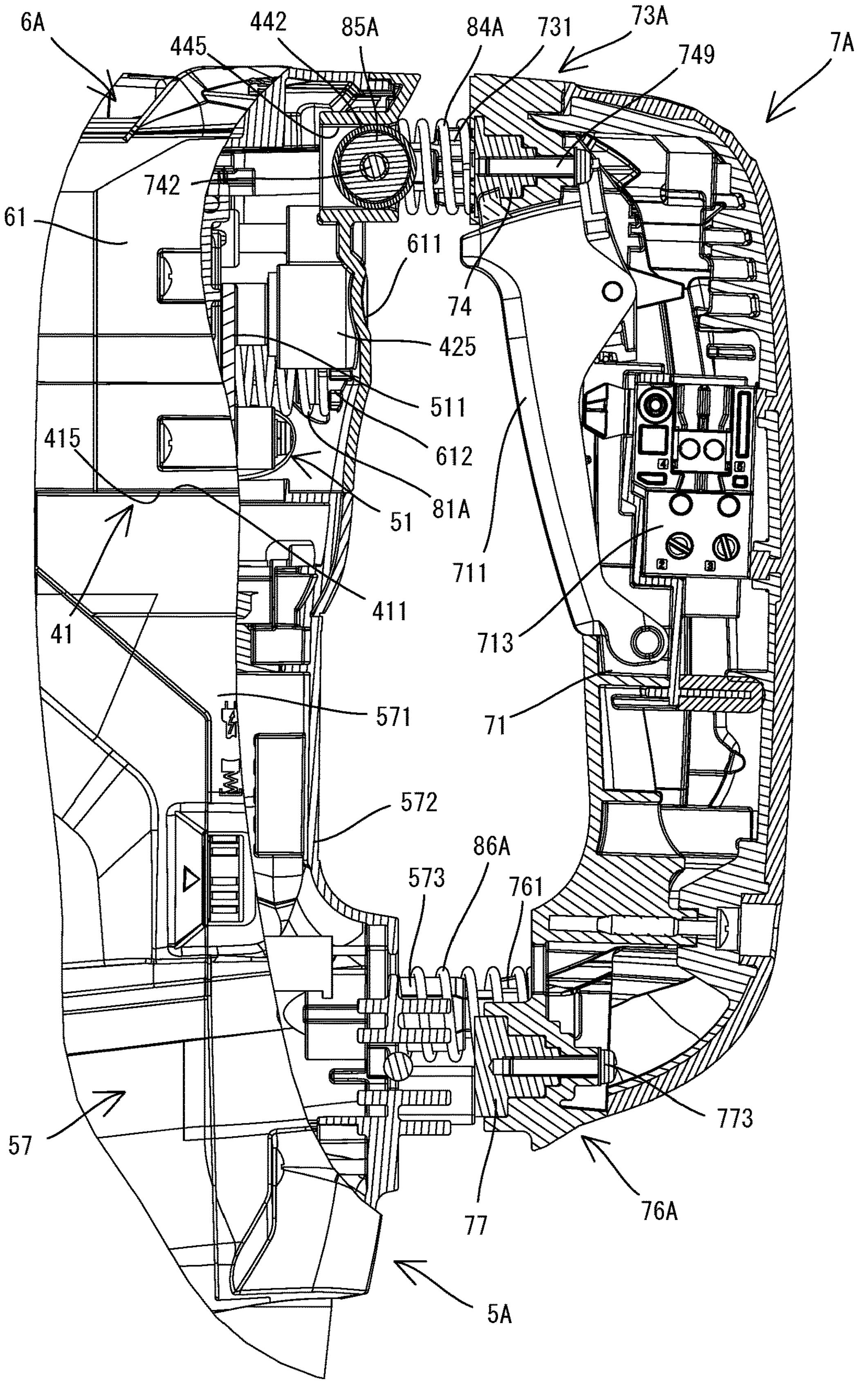
FIG. 4 is a sectional view taken along line IV-IV in FIG. 2.

The structure of connecting the tool body 5A and the outer housing 6A is now described. In this embodiment, the tool body 5A and the outer housing 6A are elastically connected to be slidable relative to each other substantially in parallel to the driving axis DX (i.e. in the front-rear direction). In addition, the tool body 5A and the outer housing 6A are also elastically connected to be movable relative to each other in directions that intersect the driving axis DX. In this embodiment, as shown in FIGS. 1, 3 and 4, two springs 81A, two elastic members 82A and an O-ring 83 are disposed between the tool body 5A and the outer housing 6A.

In this embodiment, compression coil springs are employed as the springs 81A. The compression coil spring is an example of a mechanical spring. Each of the springs 81A is disposed in a compressed state between a rear end portion of the driving-mechanism-housing part 51 (the crank housing 53) and a rear end portion of the outer housing 6A. More specifically, a front end portion of each of the springs 81A is fitted and supported onto a spring receiver 374 (projection) that is provided on a rear end portion of the housing part 373 of each of the dynamic vibration reducers 37. A rear end portion of each of the springs 81A is fitted and supported onto each of spring receivers 612 (projections) that are provided on an inner surface of a rear wall 611 of the outer housing 6A. The springs 81A each bias the tool body 5A and the outer housing 6A away from each other in the front-rear direction (i.e., forward and rearward, respectively) and allow them to move relative to each other in the front-rear direction. In this embodiment, the two springs 81A are arranged symmetrically on opposite sides of the plane P.

The elastic members 82A of this embodiment are each made of urethane foam. Screws (two screws) 423 are fixed to a rear wall 511 of the driving-mechanism-housing part 51 (the crank housing 53) and extend rearward. Each of the elastic members 82A has a cylindrical shape and is fitted and held around a shaft part of the screw 423. each of the elastic member 82A is covered with a cover 421 having a bottomed cylindrical shape. The cover 421 is made of metal and covers an outer peripheral surface of the elastic member 82A. The elastic member 82A is disposed between the shaft part of the screw 423 and the cover 421 in directions intersecting an axis of the screw 423 (in other words, in radial directions of the screw 423, in directions intersecting the driving axis DX, or in all directions other than the front-rear direction). The elastic member 82A allows the screw 423 to move relative to the cover 421 in all directions intersecting the axis of the screw 423.

The O-ring 83 is an annular rubber member. The O-ring 83 is fitted in an annular groove formed in an outer periphery of the barrel 52 of the driving-mechanism-housing part 51 and is disposed between the barrel 52 and the front half (cylindrical wall) of the outer housing 6A in the radial direction of the barrel 52. The O-ring 83 allows the barrel 52 to move relative to the outer housing 6A in all directions.

In this embodiment, the tool body 5A and the outer housing 6A are configured to be slidable relative to each other in the front-rear direction.

Specifically, as shown in FIGS. 1 and 4, the peripheral wall 571 of the motor-housing part 57 of the tool body 5A has an upper end surface 411. The peripheral wall 61 of the outer housing 6A has a lower end surface 415. The upper end surface 411 and the lower end surface 415 are configured as sliding surfaces to be slidable in abutment with each other. In this embodiment, the upper end surface 411 and the lower end surface 415 form a first guide part 41 that is configured to guide sliding movement of the tool body 5A and the outer housing 6A relative to each other in the front-rear direction.

As shown in FIGS. 3 and 4, two cylindrically-shaped guide cylinders 425 are formed on the rear wall 611 of the outer housing 6A. The two guide cylinders 425 are arranged symmetrically on the opposite sides of the plane P so as to correspond to the two elastic members 82A. Each of the guide cylinders 425 protrudes forward from the inner surface of the rear wall 611. The inner diameter of the guide cylinder 425 is generally equal to the outer diameter of the cover 421. Thus, the covers 421 are slidable in the front-rear direction within the corresponding guide cylinders 425. The cover 421 and the guide cylinder 425 form a second guide part 42 that is configured to guide sliding movement of the tool body 5A and the outer housing 6A relative to each other in the front-rear direction. There are thus two second guide parts 42 that are arranged symmetrically on the opposite sides of the plane P.

As described above, the tool body 5A and the outer housing 6A are slidable relative to each other in the front-rear direction while being guided by the first part 41 and the second guide parts 42 under the elastic force of the springs 81A. The tool body 5A and the outer housing 6A are also movable relative to each other in directions (e.g., in the up-down direction and in the left-right direction) that intersect the driving axis DX under the elastic force of the elastic members 82A and the O-ring 83. This structure effectively reduces transmission of vibration in the front-rear direction and vibration in the directions that intersect the driving axis DX from the tool body 5A to the outer housing 6A.

The handle 7A and elements (structures) disposed therein are now described.

As shown in FIG. 4, the handle 7A of this embodiment includes the grip part 71, an upper connection part 73A and a lower connection part 76A. The upper connection part 73A is connected to an upper end of the grip part 71 and slightly protrudes forward from the grip part 71. The upper connection part 73A is elastically connected to the outer housing 6A. The lower connection part 76A is connected to a lower end of the grip part 71 and slightly protrudes forward from the grip part 71. The lower connection part 76A is elastically connected to the tool body 5A.

The elongate switch lever 711 is disposed in an upper end portion of the grip part 71 of the handle 7A. The switch lever 711 is supported at its lower end portion by the grip part 71 so as to be pivotable substantially in the front-rear direction. The switch lever 711 is biased forward, and configured to be pivoted rearward when depressed by a user. A switch 713 is housed within the grip part 71. The switch 713 is normally OFF, and turned ON when the switch lever 711 is depressed. The switch 713 is connected to the motor 2 via wires (not shown), and the motor 2 is driven while the switch 713 is ON.

The structures of connecting the handle 7A to the outer housing 6A and the tool body 5A are now described.

Figure 6:
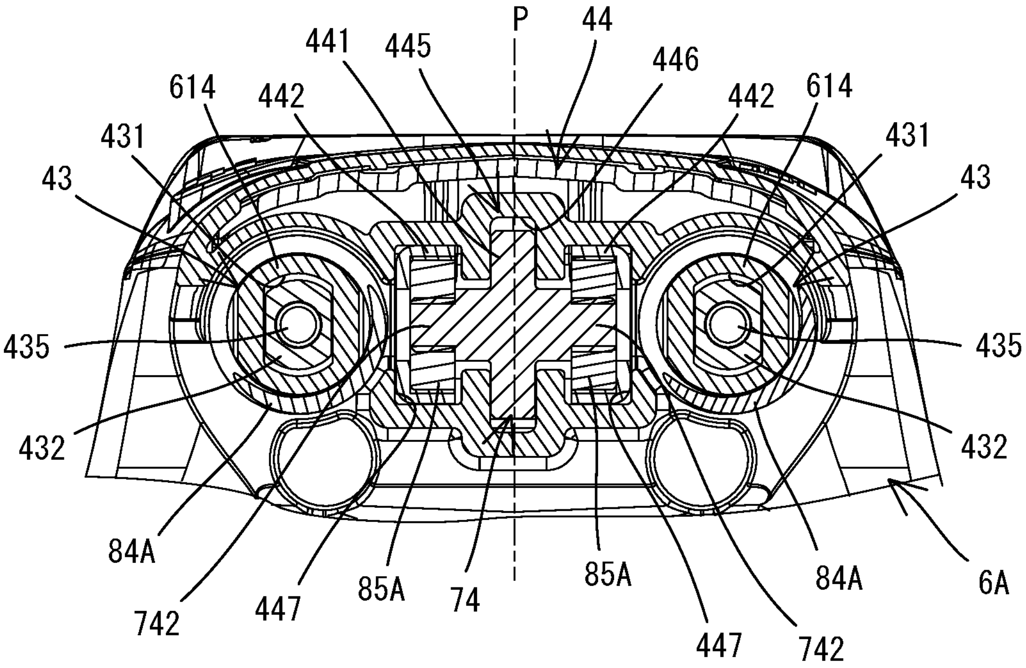
FIG. 6 is a partial, enlarged view of FIG. 5.

First, the structure of connecting the upper connection part 73A and the outer housing 6A is described. In this embodiment, the upper connection part 73A and the outer housing 6A are elastically connected so as to be movable relative to each other substantially in parallel to the driving axis DX (i.e. in the front-rear direction) and also in directions that intersect the driving axis DX. More specifically, as shown in FIGS. 3, 4 and 6, two springs 84A and two elastic members are disposed between the upper connection part 73A and the outer housing 6A.

In this embodiment, compression coil springs are employed as the springs 84A. Each of the springs 84A is disposed in a compressed state between the rear wall 611 of the peripheral wall 61 of the outer housing 6A and the upper connection part 73A of the handle 7A. More specifically, a front end portion of each of the springs 84A is fitted and supported onto each of spring receivers 614 that are provided on a rear surface of the rear wall 611. A rear end portion of each of the springs 84A is fitted and supported onto each of spring receivers 731 that are provided on a front surface of the upper connection part 73A. The springs 84A each bias the outer housing 6A and the upper connection part 73A (the handle 7A) away from each other in the front-rear direction (i.e., forward and rearward, respectively) and allow them to move relative to each other in the front-rear direction. In this embodiment, the two springs 84A are arranged symmetrically on the opposite sides of the plane P.

Each of the spring receivers 614 of the outer housing 6A is a tubular portion that protrudes rearward from the real wall 611. A guide hole 431 extends through the spring receiver 614 in the front-rear direction. The guide hole 431 is defined by two parallel flat surfaces and two curved surfaces. Thus, the guide hole 431 has a double D-shaped section. The two parallel flat surfaces of the guide hole 431 are substantially orthogonal to the left-right direction. One of the curved surfaces connects upper ends of the parallel surfaces and the other of the curved surfaces connects lower ends of the parallel surfaces.

Each of the spring receivers 731 of the handle 7A is a projection that protrudes forward from the upper connection part 73A. A guide shaft 432 protrudes forward from a central part of the spring receiver 731. A threaded hole 433 is formed in the guide shaft 432 and the spring receiver 731 and extends in the front-rear direction.

The guide shaft 432 is configured to be inserted into the guide hole 431 of the spring receiver 614. More specifically, an outer peripheral surface of the guide shaft 432 includes two parallel flat surfaces and two curved surfaces. Thus, the guide shaft 432 has a double D-shaped section. The width (the distance between the parallel flat surfaces) of the guide shaft 432 in the left-right direction is substantially equal to the width (the distance between the parallel flat surfaces) of the guide hole 431 in the left-right direction. The height (the distance between the curved surfaces) of the guide hole 431 in the up-down direction is larger than the height (the distance between the curved surfaces) of the guide shaft 432 in the up-down direction. Thus, a clearance is provided in the guide hole 431 in the up-down direction.

The upper connection part 73A and the outer housing 6A are connected to each other by screws 435 that are respectively screwed into the threaded holes 433 from the inside of the rear wall 611, in a state in which each of the springs 84A is supported by the corresponding spring receivers 731, 614 and each of the guide shafts 432 is inserted into the corresponding guide hole 431. In FIG. 3, the spring receivers 614 and the screws 435 are not shown in their entireties, but the structure of connecting the upper connection part 73A and the outer housing 6A is substantially the same as the structure of connecting the lower connection part 76A and the tool body 5A shown in FIG. 7.

Owing to the above-described structure, each of the guide shafts 432 is slidable in the front-rear direction and the up-down direction (including when an axis of the guide shaft 432 tilts in the up-down direction relative to the driving axis DX) within the guide hole 431, while being restricted only from moving in the left-right direction. The guide hole 431 and the guide shaft 432 form a third guide part 43 that is configured to guide relative movement of the upper connection part 73A and the outer housing 6A. Thus, there are two third guide parts 43 that are arranged symmetrically on the opposite sides of the plane P.

The elastic members 85A are made of urethane foam. As shown in FIGS. 3, 4 and 6, the elastic members 85A are supported by a guide member 74 that is fixed to the handle 7A. The guide member 74 is fixed to the upper connection part 73A of the handle 7A with a screw 749 and extends forward along the plane P from the upper connection part 73A. The guide member 74 of this embodiment is a plate-like member having a thickness in the left-right direction. Two shaft parts 742 respectively protrude to the left and right from a front end portion 441 of the guide member 74. The shaft parts 742 are arranged symmetrically on the opposite sides of the plane P in the left-right direction, and arranged substantially in the same position as the third guide parts 43 in the up-down direction.

The elastic members 85A each have a cylindrical shape and are fitted and held onto the shaft parts 742. Thus, the two elastic members 85A are arranged symmetrically on the opposite sides of the plane P. Each of the elastic members 85A is covered with a cover 442 having a bottomed cylindrical shape. The cover 442 is made of metal and covers an outer peripheral surface of the elastic member 85A. The elastic member 85A is disposed between the shaft part 742 and the cover 442 in all directions that intersects an axis of the shaft part 742 (in other words. in radial directions of the shaft part 742, in directions intersecting the left-right direction, or in all directions other than the left-right direction). The elastic member 85A allows the shaft part 742 to move relative to the cover 442 in all directions intersecting the axis of the shaft part 742.

It is preferable that the elastic member 85A and the cover 442 are substantially the same components (parts) as the elastic member 82A and the cover 421, respectively, in view of reducing the manufacturing costs. The elastic member 85A and the cover 442 may, however, be different in structure (for example, in shape and material) from the elastic member 82A and the cover 421, depending on the required vibration isolating characteristics.

A guide passage 445 is defined in the rear wall 611 of the outer housing 6A. The guide passage 445 extends through the rear wall 611. The front end portion 441 of the guide member 74, the elastic members 85A supported by the shaft parts 742, and the covers 442 are disposed within the guide passage 445 so as to be movable relative to the outer housing 6A in the front-rear direction. More specifically, the guide passage 445 includes a first part 446 and two second parts 447. The front end portion 441 of the guide member 74 is disposed within the first part 446, and the covers 442 are respectively disposed within the second parts 447.

The width of the first part 446 in the left-right direction is substantially equal to the thickness of the front end portion 441 in the left-right direction. The height of the first part 446 in the up-down direction is larger than the height of the front end portion 441 in the up-down direction. Thus, a clearance is provided in the first part 446 in the up-down direction. The width of the second part 447 in the left-right direction is substantially equal to the width of the cover 442 in the left-right direction, and the height of the second part 447 in the up-down direction is also substantially equal to the height (outer diameter) of the cover 442 in the up-down direction. Thus, a clearance is not substantially provided in the second part 447 in the up-down direction. Owing to the above-described structure, the guide member 74 is movable within the guide passage 445 while being restricted from moving in the left-right direction. More specifically, the front end portion of the guide member 74 is slidable in the front-rear direction and in the up-down direction (including when the axis of the screw 749 tilts in the up-down direction relative to the driving axis DX) within the first part 446, while being restricted from moving in the left-right direction. Further, the covers 442 that are respectively fitted on the shaft parts 742 via the elastic members 85A are slidable in the front-rear direction within the corresponding second parts 447 while being restricted from moving in the left-right direction and the up-down direction. The elastic member 85A allows the shaft part 742 (the guide member 74) to move in the front-rear direction and the up-down direction within the second part 447. The guide passage 445, the guide member 74 (the front end portion 441) and the covers 442 form a fourth guide part 44 that is configured to guide relative movement of the upper connection part 73A and the outer housing 6A.

As described above, the upper connection part 73A and the outer housing 6A are slidable relative to each other in the front-rear direction while being guided by the third and fourth guide parts 43, 44 under the elastic force of the springs 84A. The upper connection part 73A and the outer housing 6A are also movable relative to each other in all directions other than the left-right direction under the elastic force of the elastic members 85A. Therefore, even if vibration in the front-rear direction or in any direction (e.g., the up-down direction) other than the left-right direction is transmitted from the tool body 5A to the outer housing 6A, this structure reduces transmission of the vibration from the outer housing 6A to the handle 7A. This effectively reduces transmission of vibration in various directions from the tool body 5A to the handle 7A.

Figure 7:
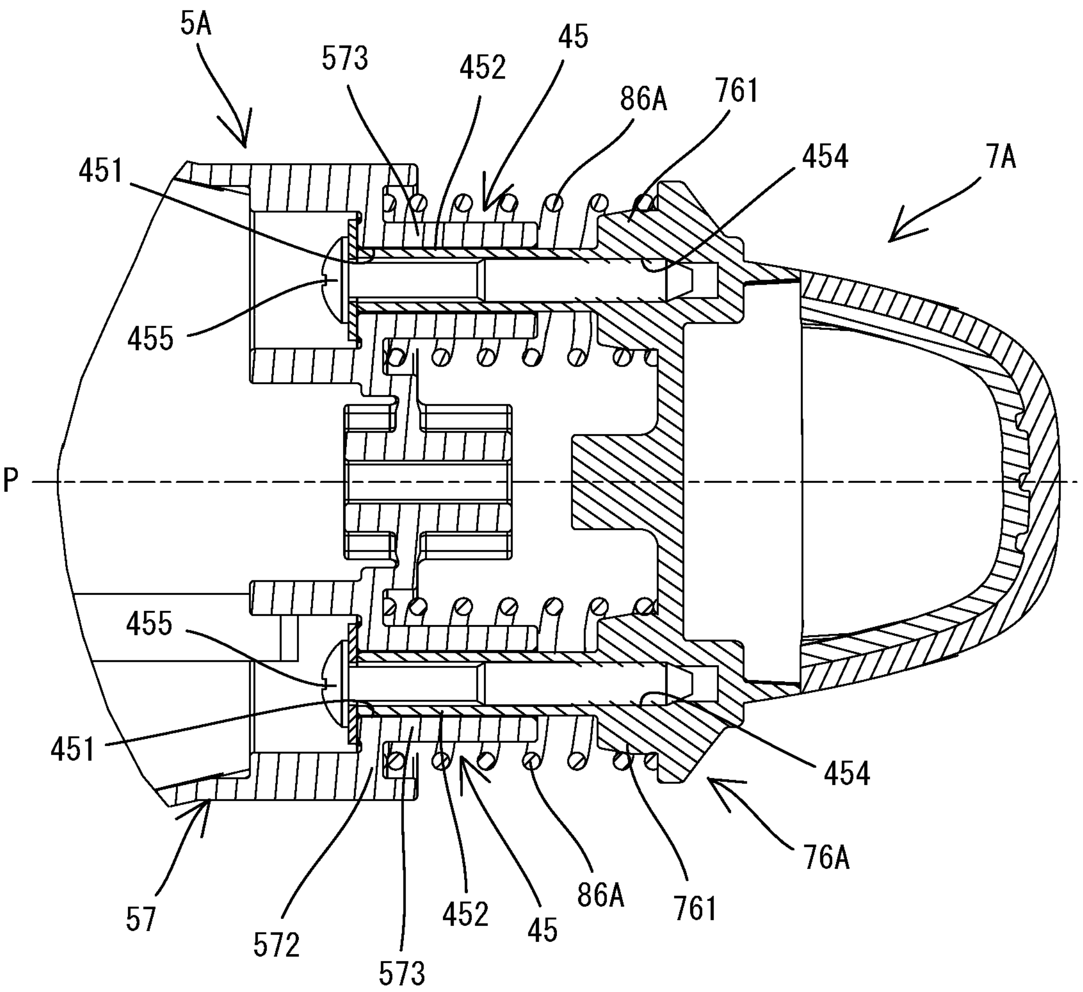
FIG. 7 is a sectional view taken along line VII-VII in FIG. 1.

The structure of connecting the lower connection part 76A and the tool body 5A is now described. In this embodiment, the lower connection part 76A and the tool body 5A are elastically connected so as to be movable relative to each other substantially in parallel to the driving axis DX (i.e. in the front-rear direction). More specifically, as shown in FIGS. 4 and 7, two springs 86A are disposed between the lower connection part 76A and the tool body 5A. The two springs 86A are arranged symmetrically on the opposite sides of the plane P.

In this embodiment, compression coil springs are employed as the springs 86A. Each of the springs 86A is disposed in a compressed state between the rear wall 572 of the motor-housing part 57 of the tool body 5A and the lower connection part 76A of the handle 7A. More specifically, a front end portion of each of the springs 86A is fitted and supported onto each of spring receivers 573 that are provided on a rear surface of the rear wall 572. A rear end portion of each of the springs 86A is fitted and supported onto each of spring receivers 761 that are provided on a front surface of the lower connection part 76A. The springs 86A each bias the tool body 5A and the lower connection part 76A (the handle 7A) away from each other in the front-rear direction (i.e., forward and rearward, respectively) and allow them to move relative to each other in the front-rear direction.

Figure 5:
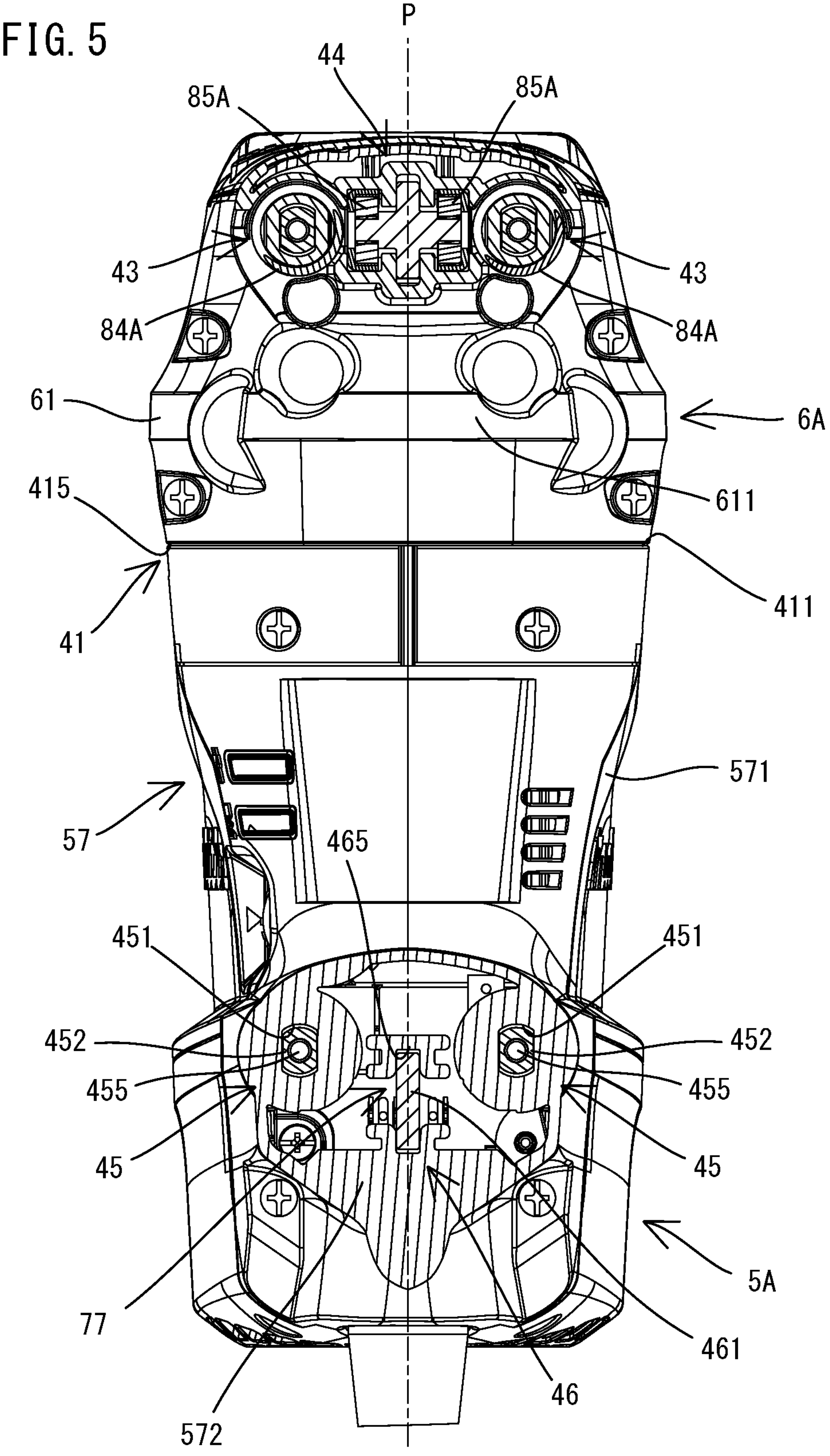
FIG. 5 is a sectional view taken along line V-V in FIG. 1.

Each of the spring receivers 573 of the tool body 5A has substantially the same structure as the spring receiver 614 of the outer housing 6A. Each of the spring receivers 761 of the lower connection part 76A has substantially the same structure as the spring receiver 731 of the upper connection part 73A. Therefore, briefly describing, as shown in FIGS. 4, 5 and 7, the spring receiver 573 is a tubular part that protrudes rearward from the real wall 572 and has a guide hole 451 having a double D-shaped section. The spring receiver 761 is a projection that protrudes forward from the lower connection part 76A and has a guide shaft 452 having a double D-shaped section. A clearance is provided in the guide hole 451 in the up-down direction. The lower connection part 76A and the tool body 5A are connected to each other by screws 455 that are respectively screwed into threaded holes 454 from the inside of the rear wall 572, in a state in which each of the springs 86A is supported by the corresponding spring receivers 761, 573 and the guide shaft 452 is inserted into the corresponding guide hole 451.

Owing to the above-described structure, each of the guide shafts 452 is slidable in the front-rear direction and the up-down direction (including when an axis of the guide shaft 452 tilts in the up-down direction relative to the driving axis DX) within the guide hole 451, while being restricted only from moving in the left-right direction. The guide hole 451 and the guide shaft 452 form a fifth guide part 45 that is configured to guide relative movement of the lower connection part 76A and the tool body 5A. Thus, there are two fifth guide parts 45 that are arranged symmetrically on the opposite sides of the plane P.

In this embodiment, the springs 86A have substantially the same specifications as the springs 84A disposed between the outer housing 6A and the upper connection part 73A. Specifically, all of the springs 84A and the springs 86A are compression coil springs that are made of the same material and have the same shape, and thus have the same spring constant. However, the springs 86A are mounted under a condition that is different from that for the springs 84A between the outer housing 6A and the upper connection part 73A. More specifically, each of the springs 84A, which are closer to the driving axis DX than the springs 86A, is mounted with a larger initial load (also referred to as a setting load or a preload) applied thereto than that applied to each of the springs 86A (see FIG. 4). The state that "an initial load is applied" to a biasing member refers to the state that the biasing member is compressed with a load applied thereto in the compressing direction in a static state.

Processing operation using the rotary hammer 1A is performed while the tool accessory 91 is pressed against a workpiece. Pressing of the tool accessory 91 against a workpiece can be stabilized by setting the initial load (biasing force) of the springs 84A, which connect the outer housing 6A and the upper connection part 73A that is closer to the driving axis DX than the lower connection part 76A, to be larger than that of the springs 86A. Further, the vibration isolating effect can be enhanced by setting the initial load (biasing force) of the springs 86A, which connect the motor-housing part 57 and the lower connection part 76A, to be smaller than that of the springs 84A. Thus, in this embodiment, vibration isolating effect can be optimized by setting the initial loads of the springs 84A, 86A as described above.

In a modified embodiment, the spring 86A may have a smaller spring constant than the spring 84A, and the springs 84 A and the springs 86A may be mounted under substantially the same condition. This modified embodiment can achieve the same effect as in the structure in which the initial loads of the springs 84A, 86A are set as described above.

Further, as shown in FIGS. 1, 4 and 5, a guide member 77 is fixed to the lower connection part 76A. The guide member 77 is fixed to the lower connection part 76A with a screw 773 and extends forward along the plane P from the lower connection part 76A. Like the guide member 74 fixed to the upper connection part 73A, the guide member 77 is a plate-like member having a thickness in the left-right direction. The guide member 77, however, does not have a shaft part.

A guide passage 465 is formed in the rear wall 572 of the motor-housing part 57 of the tool body 5A. The guide passage 465 extends through the rear wall 572. A front end portion 461 of the guide member 77 is disposed within the guide passage 465 so as to be movable relative to the tool body 5A in the front-rear direction. The width of the guide passage 465 in the left-right direction is substantially equal to the thickness of the front end portion 461 in the left-right direction. The height of the guide passage 465 in the up-down direction is larger than the height of the front end portion 461 in the up-down direction. Thus, a clearance is provided in the guide passage 465 in the up-down direction.

Owing to the above-described structure, the guide member 77 is slidable in the front-rear direction and in the up-down direction (including when the axis of the screw 773 tilts in the up-down direction relative to the driving axis DX) within the guide passage 465 while being restricted from moving in the left-right direction. The guide passage 465 and the guide member 77 (the front end portion 461) form a sixth guide part 46 that is configured to guide relative movement of the lower connection part 76A and the tool body 5A.

As described above, the lower connection part 76A and the tool body 5A are slidable relative to each other in the front-rear direction while being guided by the fifth and sixth guide parts 45, 46 under the elastic force of the springs 86A. This structure effectively reduces transmission of vibration in the front-rear direction from the tool body 5A to the handle 7A. In this embodiment, there is no elastic member made of urethane foam between the lower connection part 76A (guide member 77) and the tool body 5A. However, in a modified embodiment, at least one elastic member made of urethane foam may be provided between the lower connection part 76A (guide member 77) and the tool body 5A, like that between the upper connection part 73A and the outer housing 6A.

In this embodiment, the upper connection part 73A and the outer housing 6A, and the lower connection part 76A and the tool body 5A are not elastically connected in the left-right direction, considering that vibration in the left-right direction is relatively small in a power tool with a hammer mechanism, e.g., the rotary hammer 1A. In this embodiment, as described above, the outer housing 6A is elastically connected to the tool body 5A so as to be movable relative to the tool body 5A in the left-right direction, so that vibration of the outer housing 6A in the left-right direction is reduced. Therefore, the operability of the handle 7A is improved by restricting movement of the handle 7A in the left-right direction relative to the outer housing 6A and the tool body 5A.

In this embodiment, to cope with the largest and most dominant vibration in the front-rear direction, compression coil springs, which are suitable for isolating vibration in a single direction, are employed as the springs 81A, 84A, 86A. Further, to cope with smaller vibration in the other directions than that in the front-rear direction, urethane foam, which can be easily made to have a desired shape, is employed as the elastic members 82A, 85A. By such provision of the springs and elastic members, vibration isolating effect is optimized according to the characteristics of vibration in various directions.

Second Embodiment

Figure 8:
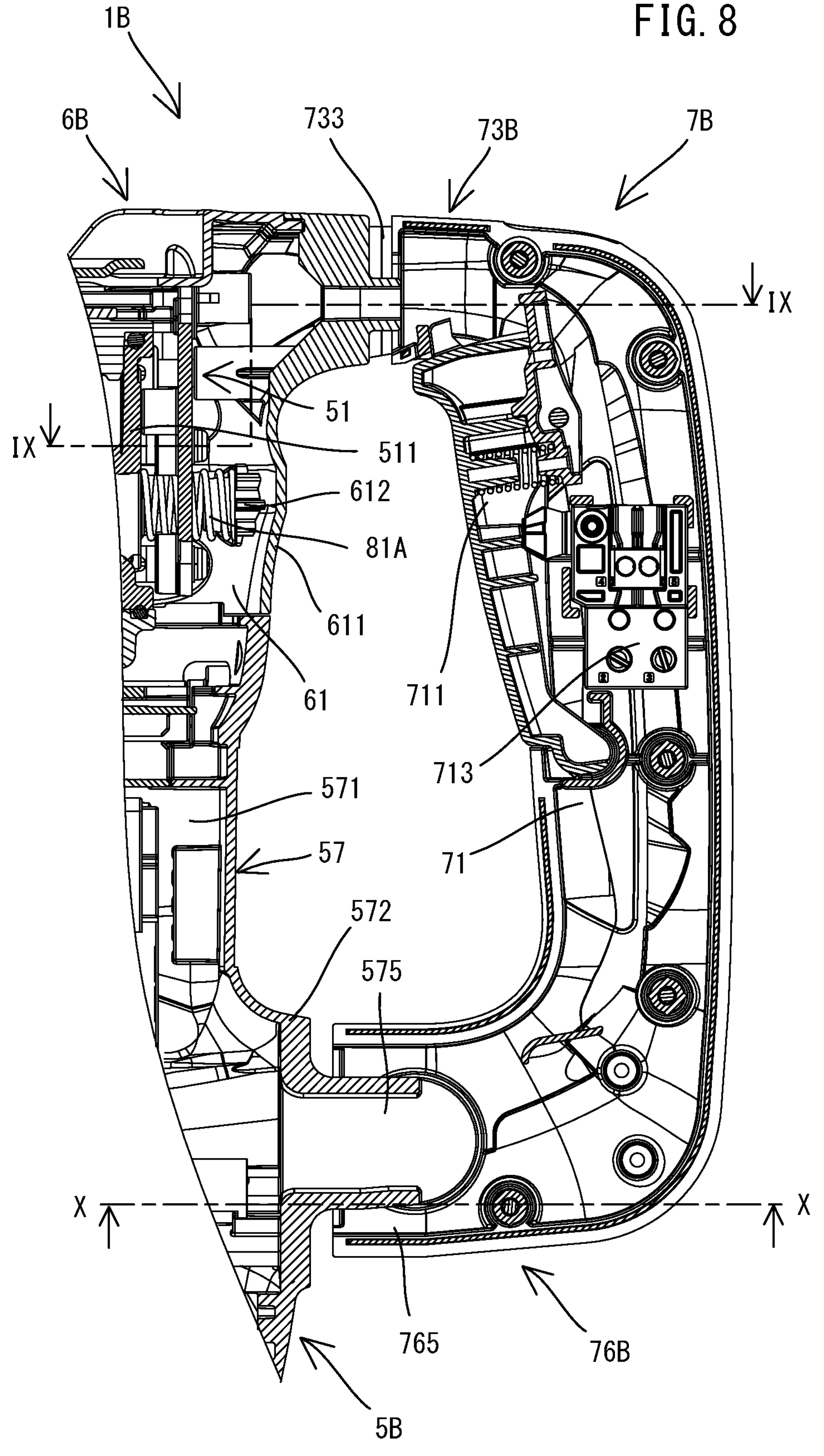
FIG. 8 is a partial, sectional view of a rotary hammer according to a second embodiment.
Figure 9:
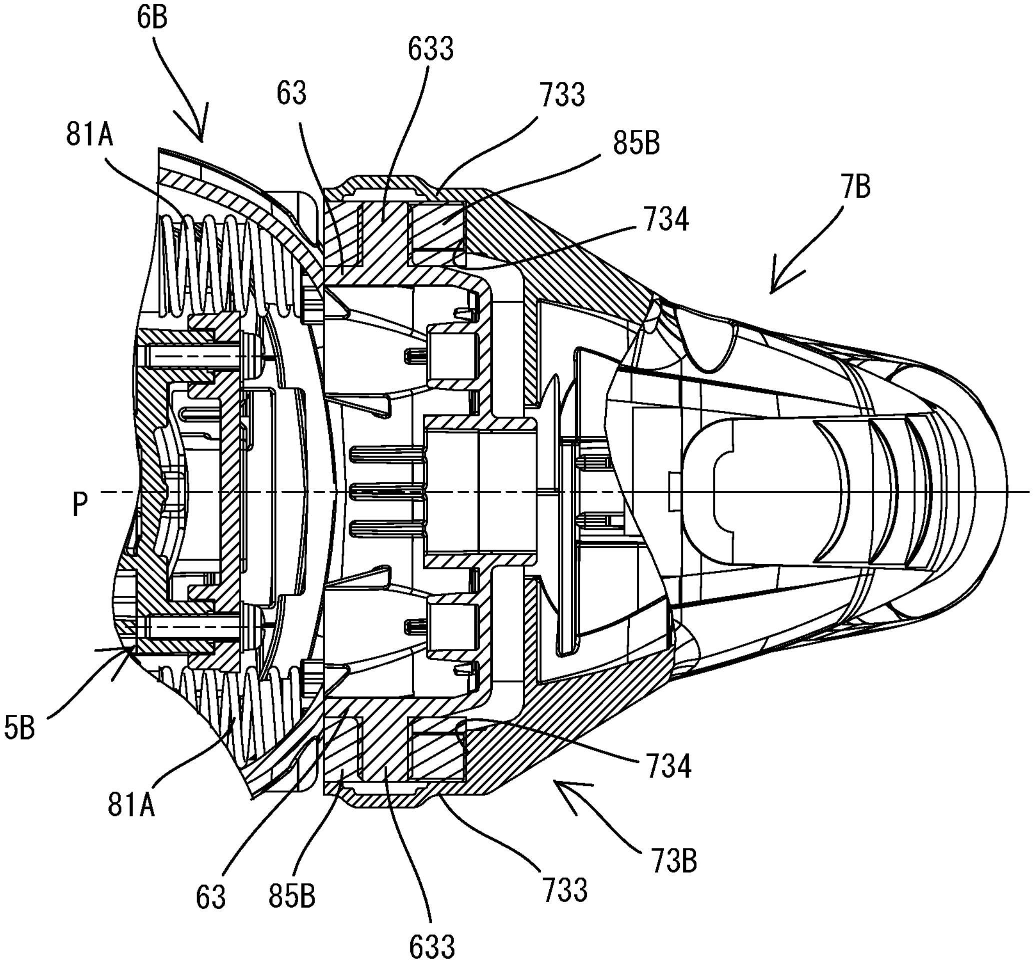
FIG. 9 is a sectional view taken along line IX-IX in FIG. 8.
Figure 10:
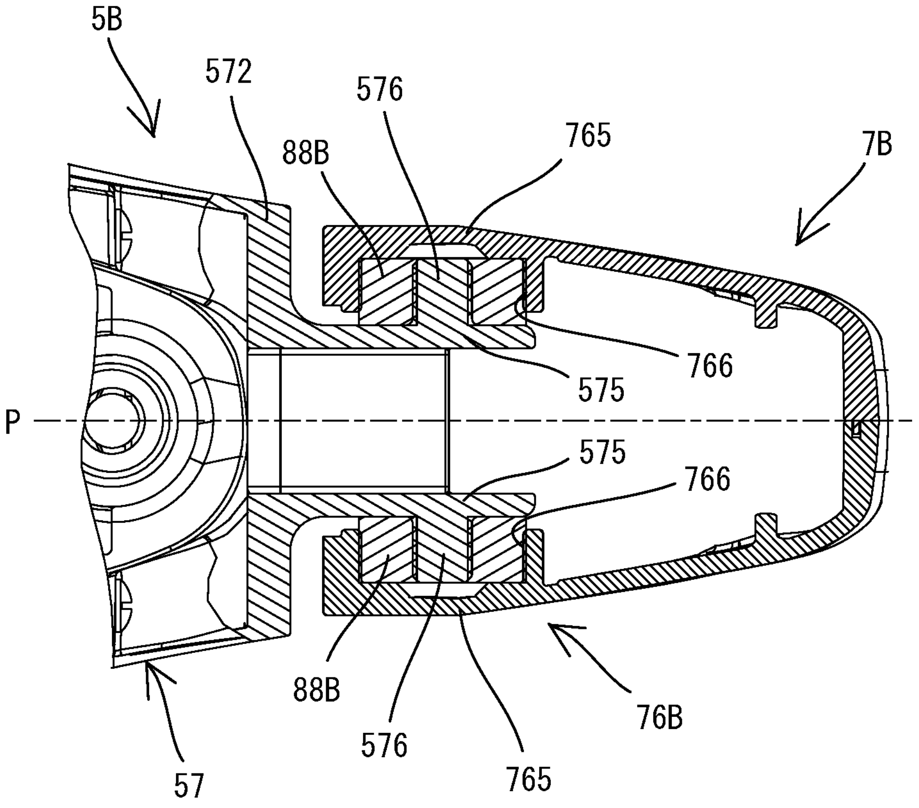
FIG. 10 is a sectional view taken along line X-X in FIG. 8.

A rotary hammer 1B according to the second embodiment of the present disclosure is now described with reference to FIGS. 8 to 10. The rotary hammer 1B is different from the rotary hammer 1A of the first embodiment in the structure of connecting a tool body 5B to an outer housing 6B and the structures of connecting a handle 7B to the outer housing 6B and to the tool body 5B. In the other points, the rotary hammer 1B has substantially the same structure (including a structure slightly different in shape) as the rotary hammer 1A.

First, the structure of connecting the tool body 5B and the outer housing 6B is described.

In this embodiment, the tool body 5B and the outer housing 6B are elastically connected so as to be slidable relative to each other substantially in parallel to the driving axis DX (i.e. in the front-rear direction). The tool body 5B and the outer housing 6B are also elastically connected to be movable relative to each other in directions that intersect the driving axis DX. More specifically, as shown in FIGS. 8 and 9, like in the first embodiment, the rotary hammer 1B includes the springs 81A, the O-ring 83 (see FIG. 1) and the first guide part 41 (see FIG. 4), but the rotary hammer 1B does not have the elastic members 82A and the second guide parts 42.

The structures of connecting the handle 7B to the outer housing 6B and to the tool body are now described.

First, the structure of connecting an upper connection part 73B and the outer housing 6B is described. In this embodiment, the upper connection part 73B and the outer housing 6B are elastically connected so as to be movable relative to each other in all directions including the front-rear direction, the up-down direction and the left-right direction. More specifically, as shown in FIG. 9, two elastic members 85B are disposed between the upper connection part 73B and the outer housing 6B.

The elastic members 85B are each made of urethane foam. The elastic members 85B are respectively supported by shaft parts 633 provided on the outer housing 6B. The shaft parts 633 respectively protrude to the left and right from left and right side portions 63 of a rear end portion of the outer housing 6B. The shaft parts 633 are arranged symmetrically on the opposite sides of the plane P in the left-right direction. The elastic members 85B each have a cylindrical shape and are fitted and held onto the shaft parts 633. Thus, the two elastic members 85B are arranged symmetrically on the opposite sides of the plane P.

The upper connection part 73B has a pair of (left and right) extending parts 733. The extending parts 733 protrude forward so as to partially cover the left and right side portions 63 of the rear end portion of the outer housing 6B. Each of the elastic members 85B is fitted in a recess 734 formed on the inside of each of the extending parts 733. Each of the elastic members 85B is disposed in a compressed state between the side portion 63 of the rear end portion of the outer housing 6B and the extending part 733 of the upper connection part 73B. The outer housing 6B and the upper connection part 73B are held apart from each other in all directions. Each of the shaft parts 633 is movable within the recess 734 in an axial direction of the shaft part 633 (i.e., in the left-right direction) and in all directions (e.g., in the front-rear direction and the up-down direction) that intersect the axis of the shaft part 633, while elastically deforming the elastic member 85B.

The structure of connecting a lower connection part 76B and the tool body 5B is now described. In this embodiment, the lower connection part 76B and the tool body 5B are elastically connected so as to be movable relative to each other in all directions including the front-rear direction, the up-down direction and the left-right direction. More specifically, as shown in FIG. two elastic members 88B are disposed between the lower connection part 76B and the tool body 5B.

The elastic members 88B are each made of urethane foam. The elastic members 85B are supported by shaft parts 576 provided on the tool body 5B. More specifically, the motor-housing part 57 of the tool body 5B has a pair of (left and right) extending parts 575. Each of the extending parts 575 protrudes rearward from the rear wall 572 and is inserted into a front end portion of the lower connection part 76B. The shaft parts 576 respectively protrude to the left and right from the extending parts 575. The shaft parts 576 are arranged symmetrically on the opposite sides of the plane P in the left-right direction. The elastic members 88B each have a cylindrical shape and are fitted and held onto the shaft parts 576. Thus, the two elastic members 88B are arranged symmetrically on the opposite sides of the plane P.

A recess 766 is formed on the inside of each of left and right side portions 765 of a front end portion of the lower connection part 76B. Each of the elastic members 88B is fitted in the recess 766 and disposed in a compressed state between the side portion 765 of the front end portion of the lower connection part 76B and the extending part 575 of the tool body 5B. The lower connection part 76B and the tool body 5B are held apart from each other in all directions. Each of the shaft parts 576 is movable within the recess 766 in an axial direction of the shaft part 576 (i.e., in the left-right direction) and in all directions (e.g., in the front-rear direction and the up-down direction) that intersect the axis of the shaft part 576, while elastically deforming the elastic member 88B. The lower connection part 76B is pivotable around the axis of the shaft part 576 that extends substantially in the left-right direction.

It is preferable that the elastic member 88B is substantially the same component (part) as the elastic member 85B in view of reducing the manufacturing costs. On the other hand, it is preferable that the elastic member 85B, which is closer to the driving axis DX than the elastic member 88B, has a larger elastic constant than the elastic member 88B, in view of optimizing vibration isolating effect.

As described above, in this embodiment, the tool body 5B and the outer housing 6B are slidable relative to each other in the front-rear direction while being guided by the first guide part 41 under the elastic force of the springs 81A. This structure effectively reduces transmission of vibration in the front-rear direction from the tool body 5B to the outer housing 6B. Further, the tool body 5B and the outer housing 6B are also movable relative to each other in other directions (e.g., in the up-down direction and the left-right direction) that intersect the driving axis DX under the elastic force of the O-ring 83. This structure reduces transmission of vibration in the front-rear direction and in the directions that intersect the driving axis DX from the tool body 5B to the outer housing 6B.

Further, the upper connection part 73B and the outer housing 6B are movable relative to each other in the axial direction of the shaft part 633 (i.e., in the left-right direction) and in all directions (including the front-rear direction and the up-down direction) that intersect the axis of the shaft part 633, under the elastic force of the elastic members 85B. Therefore, even if vibration in the front-rear direction or in any other direction is transmitted from the tool body 5B to the outer housing 6B, this structure reduces transmission of the vibration to the handle 7B. This effectively reduces transmission of vibration in various directions from the tool body 5B to the handle 7B.

Similarly, the lower connection part 76B and the tool body 5B are movable relative to each other in the axial direction of the shaft part 576 (i.e., the left-right direction) and in all directions (including the front-rear direction and the up-down direction) that intersect the axis of the shaft part 576, under the elastic force of the elastic members 88B. This structure effectively reduces transmission of vibration in various directions from the tool body 5B to the handle 7B. Further, the lower connection part 76B, which is located farther from the driving axis DX than the upper connection part 73B, is pivotable relative to the tool body 5B around the axis of the shaft part 576 that extends substantially in the left-right direction. Thus, the upper connection part 73B and the outer housing 6B can be moved relative to each other in the front-rear direction, in which the largest vibration is caused, under the elastic force of the elastic members 85B, while the lower connection part 76B pivots relative to the tool body 5B.

Third Embodiment

Figure 11:
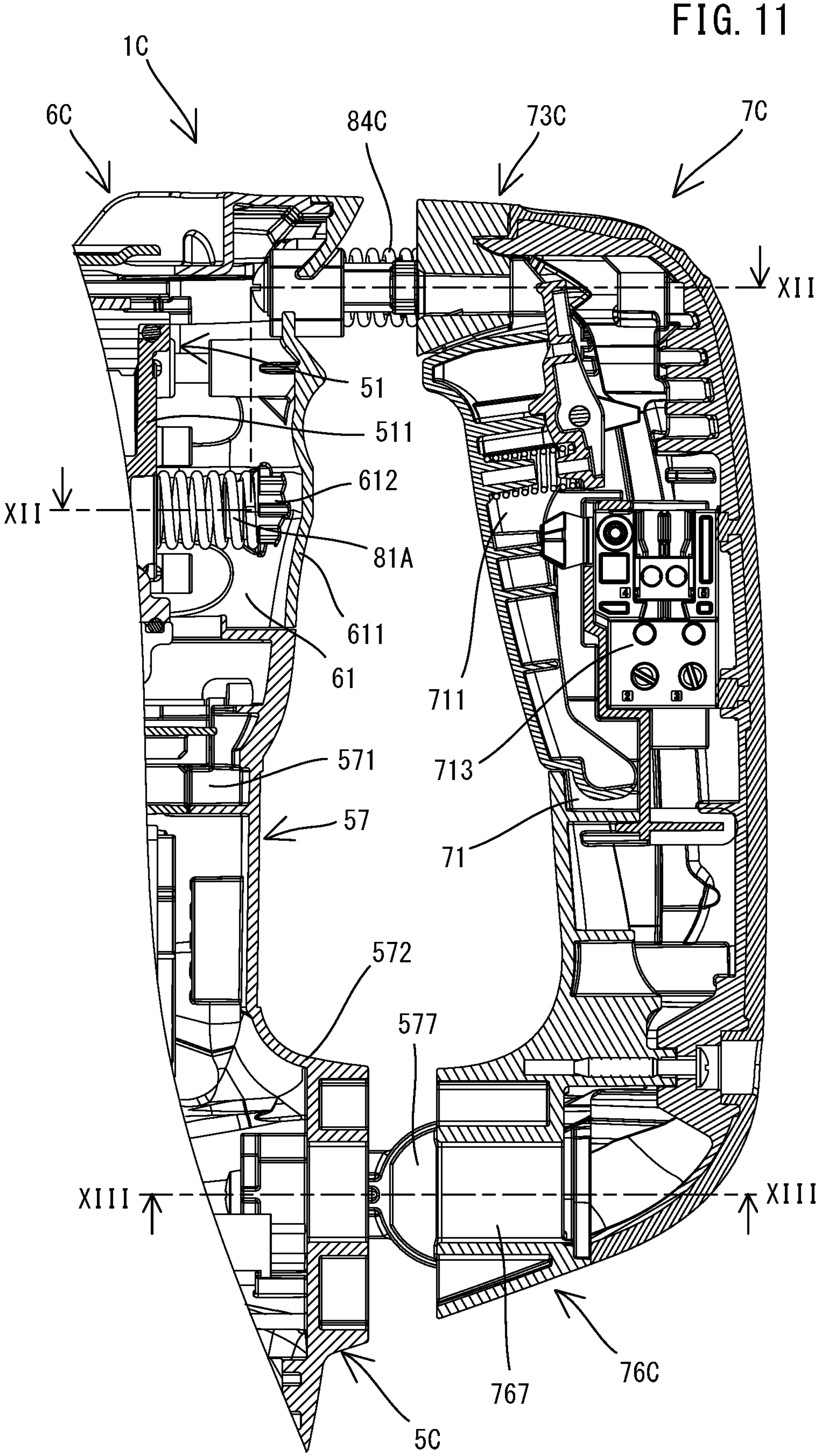
FIG. 11 is a partial, sectional view of a rotary hammer according to a third embodiment.
Figure 12:
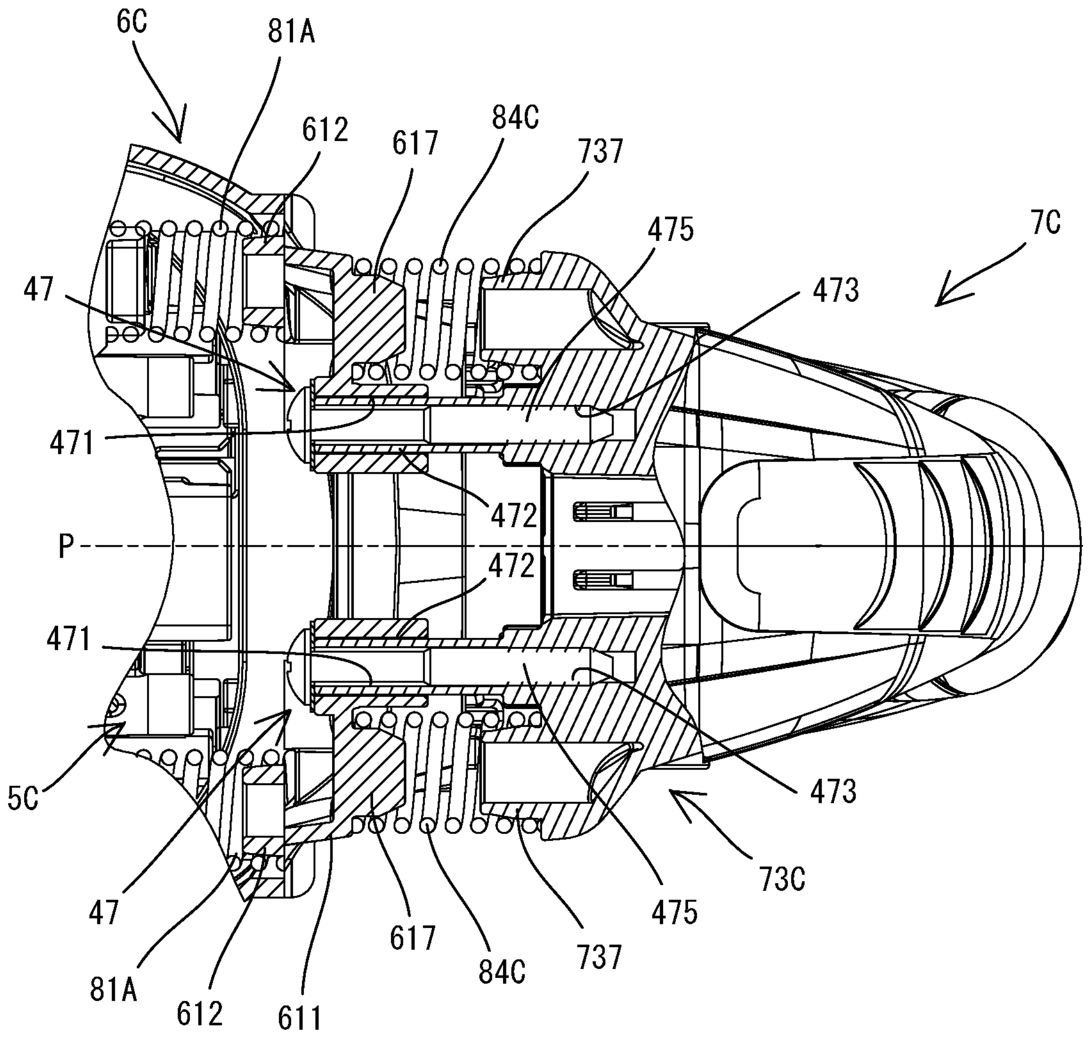
FIG. 12 is a sectional view taken along line XII-XII in FIG. 11.
Figure 13:
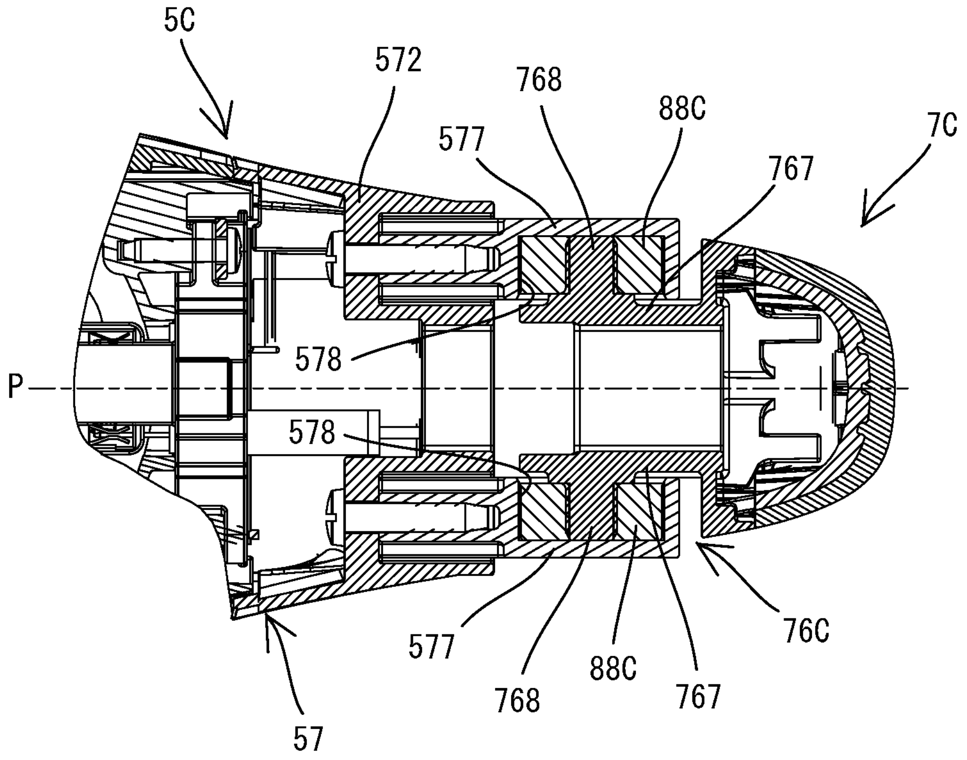
FIG. 13 is a sectional view taken along line XIII-XIII in FIG. 11.

A rotary hammer 1C according to the third embodiment of the present disclosure is now described with reference to FIGS. 11 to 13. The rotary hammer 1C is different from the rotary hammer 1B of the second embodiment in the structure of connecting a tool body 5C to an outer housing 6C and the structures of connecting a handle 7C to the outer housing 6C and to the tool body 5C. In the other points, the rotary hammer 1C has substantially the same structure (including a structure slightly different in shape) as the rotary hammer 1B.

First, the structure of connecting the tool body 5C and the outer housing 6C is described.

In this embodiment, the tool body 5C and the outer housing 6C are elastically connected so as to be slidable relative to each other substantially in parallel to the driving axis DX (i.e., in the front-rear direction). The tool body 5C and the outer housing 6C are also elastically connected to be movable relative to each other in directions that intersect the driving axis DX. More specifically, as shown in FIGS. 11 and 12, like in the second embodiment, the rotary hammer 1C has the springs 81A, the O-ring 83 (see FIG. 1) and the first guide part 41 (see FIG. 4).

The structures of connecting the handle 7C to the outer housing 6C and to the tool body are now described.

First, the structure of connecting an upper connection part 73C and the outer housing 6C is described. In this embodiment, the upper connection part 73C and the outer housing 6C are elastically connected so as to be slidable relative to each other substantially in parallel to the driving axis DX (i.e. in the front-rear direction). More specifically, as shown in FIGS. 11 and 12, two springs 84C are disposed between the upper connection part 73C and the outer housing 6C.

In this embodiment, compression coil springs are employed as the springs 84C. Each of the springs 84C is disposed in a compressed state between the rear wall 611 of the outer housing 6C and the upper connection part 73C of the handle 7C. More specifically, a front end portion of each of the springs 84C is fitted and supported onto each of spring receivers 617 (projections) that are provided on a rear surface of the rear wall 611. A rear end portion of each of the springs 84C is fitted and supported onto each of spring receivers 737 (projections) that are provided on a front surface of the upper connection part 73C. The springs 84C each bias the outer housing 6C and the upper connection part 73C (the handle 7C) away from each other in the front-rear direction (i.e., forward and rearward, respectively) and allow them to move relative to each other in the front-rear direction. In this embodiment, the two springs 84C are arranged symmetrically on the opposite sides of the plane P.

Further, the rotary hammer 1C has seventh guide parts 47 that are each configured to guide sliding movement of the upper connection part 73C relative to the outer housing 6C in the front-rear direction. More specifically, each of the seventh guide parts 47 includes a guide hole 471 formed in the outer housing 6C and a guide shaft 472 provided on the upper connection part 73C.

The guide holes 471 each extend through the rear wall 611 of the outer housing 6C in the front-rear direction. The guide shafts 472 each protrude forward from the upper connection part 73C and are respectively inserted into the guide holes 471. Each of the guide shafts 472 has a sectional shape that substantially conforms to the guide hole 471. Each of the guide shafts 472 has a threaded hole 473 that extends in its axial direction. The upper connection part 73C and the outer housing 6C are connected to each other by screws 475 that are screwed into the threaded holes 473 from the inside of the rear wall 611, in a state in which the guide shafts 472 are inserted into the respective guide holes 471. Owing to the above-described structure, each of the guide shafts 472 is slidable only in the front-rear direction within the guide hole 471. In a modified embodiment, however, like in the first embodiment, a clearance may be provided in each of the guide holes 471 in the up-down direction.

The structure of connecting a lower connection part 76C and the tool body 5C is now described. In this embodiment, the lower connection part 76C and the tool body 5C are elastically connected so as to be movable relative to each other in all directions (e.g., in the front-rear direction and the up-down direction) other than the left-right direction. More specifically, as shown in FIG. 13, two elastic members 88C are disposed between the lower connection part 76C and the tool body 5C.

The elastic members 88C are each made of urethane foam. The elastic members 85C are supported by shaft parts 768 formed on the handle 7C. The shaft parts 768 respectively protrude to the left and right from left and right side portions 767 of a front end portion of the lower connection part 76C. The shaft parts 768 are arranged symmetrically on the opposite sides of the plane P in the left-right direction. The elastic members 88C each have a cylindrical shape and are fitted and held onto the shaft parts 768. Thus, the two elastic members 88C are arranged symmetrically on the opposite sides of the plane P.

The motor-housing part 57 of the tool body 5C has a pair of (left and right) extending parts 577. The extending parts 577 each protrude rearward from the rear wall 572 so as to partially cover the side portions 767 of the lower connection part 76C. Each of the elastic members 88C is fitted in a recess 578 formed on the inside of each of the extending parts 577. Each of the elastic members 88C is disposed in a compressed state between the side portion 767 of the front end portion of the lower connection part 76C and the extending part 577 of the tool body 5C. Distal ends of the shaft parts 768 are in abutment with the corresponding extending parts 577, so that relative movement of the lower connection part 76C and the tool body 5C in the left-right direction is restricted. Each of the shaft parts 768 is movable within the recess 578 in all directions (e.g., in the front-rear direction and the up-down direction) that intersect the axis of the shaft part 768 that extends in the left-right direction, while elastically deforming the elastic member 88C. The lower connection part 76C is pivotable around the axis of the shaft part 768.

As described above, in this embodiment, the tool body 5C and the outer housing 6C are slidable relative to each other in the front-rear direction while being guided by the first guide part 41 under the elastic force of the springs 81A. This structure effectively reduces transmission of vibration in the front-rear direction from the tool body 5C to the outer housing 6C. Further, the tool body 5C and the outer housing 6C are also movable relative to each other in directions (e.g., in the up-down direction and the left-right direction) that intersect the driving axis DX under the elastic force of the O-ring 83. This structure reduces transmission of the vibration in the front-rear direction and the directions that intersect the driving axis DX from the tool body 5C to the outer housing 6C.

Further, the upper connection part 73C and the outer housing 6C are slidable relative to each other in the front-rear direction under the elastic force of the springs 84C. The lower connection part 76C and the tool body 5C are movable relative to each other in all directions (e.g., in the front-rear direction and the up-down direction) that intersect the axis of the shaft part 768, under the elastic force of the elastic members 88C, and also pivotable around the axis of the shaft part 768. Thus, the upper connection part 73C and the outer housing 6C can move relative to each other in the front-rear direction, in which the largest vibration is caused, under the elastic force of the springs 84C, while the lower connection part 76C pivots relative to the tool body 5C. Further, transmission of vibration in various directions from the tool body 5C to the handle 7C via the lower connection part 76C is effectively reduced.

Correspondences between the features of the above-described embodiments and the features of the present disclosure are as follows. However, the features of the above-described embodiments are merely exemplary and do not limit the features of the present disclosure or invention.

Each of the rotary hammers 1A, 1B, 1C is an example of a “power tool having a hammer mechanism”. The hammer mechanism 30 is an example of a “driving mechanism”. Each of the first guide part 41 and the second guide part 42 is an example of a “guide part”. The spring 81A is an example of a “first elastic member” and is also an example of a “mechanical spring”. Each of the elastic member 82A and the O-ring 83 is an example of a “second elastic member” and is also an example of a “rubber or elastic synthetic resin”. The spring 84A is an example of a “third elastic member”. The elastic member 85A is an example of a “fourth elastic member”. Each of the springs 81A, 84A, 86A, 84C is an example of a “mechanical spring”. Each of the elastic members 82A, 85A, 85B, 88B, 88C is an example of “rubber or elastic synthetic resin”. The guide member 74 is an example of a “support member”. Each of the upper connection parts 73A, 73B, 73C is an example of a “first end portion of the handle”. Each of the lower connection parts 76A, 76B, 76C is an example of a “second end portion of the handle”. Each of the shaft parts 742, 633, 576 is an example of a “shaft”.

The above-described embodiments are merely exemplary, and the power tool having a hammer mechanism according to the present disclosure is not limited to the rotary hammers 1A, 1B, 1C of the above-described embodiments. For example, the following modifications may be made. At least one of these modifications can be employed in combination with at least one of the features of the rotary hammers 1A, 1B, 1C of the above-described embodiments and the claimed invention.

A power tool having a hammer mechanism according to the present disclosure may be an electric hammer (so-called scraper, demolition hammer) that is configured to perform only the hammering action of linearly driving a tool accessory. In the electric hammer, the rotation-transmitting mechanism 35 of the driving mechanism 3 is omitted. Further, a well-known mechanism that is configured to reciprocate a piston by using a member (e.g., a swash bearing or a wobble plate/bearing) that oscillates along with rotation of a rotary body may be employed as the motion-converting mechanism, in place of the crank mechanism.

A brushless DC motor may be employed as the motor 2. The motor 2 may be driven by power supplied from a rechargeable battery. The arrangement (orientation) of the motor 2 (the rotational axis RX) relative to the driving axis DX may be appropriately changed. For example, the rotational axis RX of the motor 2 may obliquely cross the driving axis DX or may extend in parallel to the driving axis DX. The structure of the tool body 5A, 5B, 5C may be appropriately changed, depending on or regardless of a change of the arrangement of the motor 2.

The outer housing 6A, 6B, 6C may be appropriately modified insofar as the outer housing 6A, 6B, 6C at least partially covers the tool body 5A, 5B, 5C and is elastically connected to the tool body 5A, 5B, 5C so as to be slidable in the front-rear direction. The handle 7A, 7B, 7C may also be appropriately modified insofar as the handle 7A, 7B, 7C is elastically connected at least to the outer housing 6A, 6B, 6C.

For example, the outer housing 6A, 6B, 6C may cover an entirety of the tool body 5A, 5C and may be slidable relative to the tool body 5A, 5B, 5C. In such a modified embodiment, both the upper connection part 73A, 73B, 73C and the lower connection part 76A, 76B, 76C may be connected to the outer housing 6A, 6B, 6C. In another modified embodiment, the outer housing 6A, 6B, 6C may include an upper portion and a lower portion that are separately formed from each other. The upper portion may at least partially cover the driving-mechanism-housing part 51 so as to be slidable relative to the driving-mechanism-housing part 51 in the front-rear direction. The lower portion may at least partially cover the motor-housing part 57 so as to be slidable relative to the motor-housing part 57 in the front-rear direction. In this modified embodiment, the upper connection part 73A, 73B, 73C may be connected to the upper portion and the lower connection part 76A, 76B, 76C may be connected to the lower portion. In yet another modified embodiment, only one of the two end portions of the handle 7A, 7B, 7C may be connected to the outer housing 6A, 6B, 6C, and the other end portion may have a free end.

The structure, number and/or arrangement of the springs 81A that connect the tool body 5A, 5B, 5C and the outer housing 6A, 6B, 6C substantially in parallel to the driving axis DX (i.e., in the front-rear direction) may be appropriately changed. For example, a mechanical spring of a different kind (e.g., a torsion spring, a disc spring), or rubber or elastic synthetic resin may be employed in place of the spring 81A. Similar modifications may also be made to the springs 84A, 86A, 84C that connect the handle 7A, 7C and the outer housing 6A, 6C. The springs 84A may have different specifications from the springs 86A, and the springs 84A may be mounted with a larger initial load (setting load or preload) applied thereto than that applied to the springs 86A.

Similarly, the structure, number and/or arrangement of the elastic members 82A that connect the tool body 5A, 5B, 5C and the outer housing 6A, 6B, 6C in one or more directions that intersect the driving axis DX may also be appropriately changed. For example, the elastic members 82A may be made not of urethane foam, but of rubber or other elastic synthetic resin (e.g., elastomer, synthetic resin foam other than urethane). A plurality of elastic members may be disposed in place of the elastic members 82A between the tool body 5A, 5B, 5C and the outer housing 6A, 6B, 6C, for example, in the up-down direction and/or the left-right direction. Similar modifications may also be made to the elastic members 85A, 85B, 88B, 88C that connect the handle 7A, 7B, 7C and the outer housing 6A, 6B, 6C, and to the O-ring 83.

The structure for guiding sliding movement of the tool body 5A, 5B, 5C and the outer housing 6A, 6B, 6C substantially in parallel to the driving axis DX (in the front-rear direction) is not limited to the first guide part 41 and the second guide parts 42. For example, a guide part that is similar to the third guide part 43 or the seventh guide part 47 may be provided in/on the tool body 5A, 5B, 5C and the outer housing 6A, 6B, 6C. Further, the covers 421, 442 are preferably provided for the smooth sliding movement and for suppressing wear of the elastic members 82A, 85A, but they may be omitted. The number and arrangement of the guide parts are may be changed.

In view of the nature of the present disclosure and the above-described embodiments, the following aspects are provided. At least one of the following aspects can be employed in combination with at least one of the features of the above-described embodiments, modifications thereof and the claimed invention.

(Aspect 1)

The guide part includes:

a body-side guide part that is provided in/on the tool body; and an outer-side guide part that is provided in/on the outer housing and that is slidable relative to the body-side guide part in the first direction.

The upper end surface 411 of the peripheral wall 571 of the motor-housing part 57 is are an example of the "body-side guide part" of this aspect. The lower end surface 415 of the peripheral wall 61 of the outer housing 6A is an example of the "outer-side guide part" of this aspect. The cover 421 is another example of the "body-side guide part". The guide cylinder 425 is another example of the "outer-side guide part" of this aspect.

(Aspect 2)

The tool body includes (i) a driving-mechanism-housing part that houses the driving mechanism and that extends in the first direction along the driving axis, and (ii) a motor-housing part that is connected to the driving mechanism, that extends in the second direction and that houses the motor, the outer housing extends in the first direction along the driving axis and at least partially covers the driving-mechanism-housing part, the body-side guide part is provided on one end of a peripheral wall of the motor-housing part in the second direction, and the outer-side guide part is provided on one end of a peripheral wall of the outer housing part in the second direction.

(Aspect 3)

The second elastic member is an annular member that is made of rubber or elastic synthetic resin and is disposed around a shaft extending in the first direction, a first one of the body-side guide part and the outer-side guide part is a cover that covers an outer peripheral surface of the second elastic member, and a second one of the body-side guide part and the outer-side guide part is a tubular part within which the cover is disposed to be slidable in the first direction.

(Aspect 4)

The power tool further includes a restriction part that is configured to restrict movement of the handle relative to the outer housing in a third direction that is orthogonal to the first direction and the second direction.

The third guide part 43, the fourth guide part 44 and the seventh guide part 47 are examples of the "restriction part" of this aspect.

(Aspect 5)

The restriction part is configured to guide sliding movement of the handle and the outer housing relative to each other in the first direction and the second direction.

DESCRIPTION OF THE REFERENCE NUMERALS

1A, B, 1C: rotary hammer, 2: motor, 21: stator, 23: rotor, 25: motor shaft, 251: bearing, 252: bearing, 27: fan, 29: power cord, 3: driving mechanism, 30: hammer mechanism, rotation-transmitting mechanism, 36: tool holder, 37: dynamic vibration reducer, 371: weight, 372: spring, 373: housing part, 374: spring receiver, 41: first guide part, 411: upper end surface, 415: lower end surface, 42: second guide part, 421: cover, 423: screw, 425: guide cylinder, 43: third guide part, 431: guide hole, 432: guide shaft, 433: threaded hole, 435: screw, 44: fourth guide part, 441: front end portion, 442: cover, 445: guide passage, 446: first part, 447: second part, 45: fifth guide part, 451: guide hole, 452: guide shaft, 454: threaded hole, 455: screw, 46: sixth guide part, 461: front end portion, 465: guide passage, 47: seventh guide part, 471: guide hole, 472: guide shaft, 473: threaded hole, 475: screw, 5A, 5B, 5C: tool body, 51: driving-mechanism-housing part, 511: rear wall, 52: barrel, 53: crank housing, 57: motor-housing part, 571: peripheral wall, 572: rear wall, 573: spring receiver, 575: extending part, 576: shaft part, 577: extending part, 578: recess, 6A, 6B, 6C: outer housing, 61: peripheral wall, 611: rear wall, 612: spring receiver, 614: spring receiver, 617: spring receiver, 63: side portion, 633: shaft part, 7A, 7B, 7C: handle, 71: grip part, 711: switch lever, 713: switch, 73A, 73B, 73C: upper connection part, 731: spring receiver, 733: extending part, 734: recess, 737: spring receiver, 74: guide member, 742: shaft part, 749: screw, 76A, 76B, 76C: lower connection part, 761: spring receiver, 765: side portion, 766: recess, 767: side portion, 768: shaft part, 77: guide member, 773: screw, 81A, 84A, 84C, 86A: spring, 82A: elastic member, 83: O-ring, 85A, 85B, 88B, 88C: elastic member, 91: tool accessory

What is claimed is:

1. A power tool having a hammer mechanism, comprising:

a motor;

a driving mechanism that is operably connected to the motor and that is configured to at least linearly drive a tool accessory along a driving axis in response to driving of the motor;

a tool body that houses the motor and the driving mechanism;

an outer housing that is elastically connected to the tool body such that the outer housing at least partially covers the tool body and that is slidable relative to the tool body in a first direction substantially parallel to the driving axis;

a guide part that is configured to guide sliding movement of the outer housing relative to the tool body; and a handle that includes a grip part extending in a second direction that intersects the first direction, wherein the handle is elastically connected at least to the outer housing and is movable relative to the outer housing in the first direction and in at least one direction that intersects the first direction, wherein the tool body and the outer housing are (i) connected via a first elastic member to be movable relative to each other in the first direction, and (ii) connected via a second elastic member that is different from the first elastic member to be movable relative to each other in the at least one direction that intersects the first direction;

wherein: (i) the first elastic member is a mechanical spring, and (ii) the second elastic member is rubber or elastic synthetic resin;

wherein:

the outer housing and the handle are: (i) connected via a third elastic member to be movable relative to each other in the first direction, and (ii) connected via a fourth elastic member that is different from the third elastic member to be movable relative to each other in the at least one direction that intersects the first direction; wherein: (i) the third elastic member is a mechanical spring, and (ii) the fourth elastic member is rubber or elastic synthetic resin, the fourth elastic member is annular and is disposed around a shaft extending in a third direction that is orthogonal to the first direction and the second direction, the outer housing and the handle are connected via the fourth elastic member to be movable relative to each other in the second direction, the shaft is configured to restrict movement of the handle relative to the outer housing in the third direction, the second elastic member is provided integrally with the guide part and is configured to be slidable in the first direction together with the guide part, and the fourth elastic member is provided integrally with the shaft and is configured to be slidable in the first direction together with the shaft.

2. The power tool as defined in claim 1, wherein:

the handle includes (i) a first end portion that is connected to one end of the grip part that is located closer to the driving axis than the other end of the grip part in the second direction, and (ii) a second end portion connected to the other end of the grip part, each of the first end portion and the second end portion is elastically connected to the tool body or to the outer housing to be movable in the first direction, and at least one of the first end portion and the second end portion is elastically connected to the outer housing.

3. The power tool as defined in claim 2, wherein:

the first end portion is elastically connected to the outer housing, and the second end portion is elastically connected to the tool body.

4. The power tool as defined in claim 2, wherein:

each of the first end portion and the second end portion is elastically connected to the tool body or to the outer housing via a mechanical spring, and an initial load of the mechanical spring for the first end portion is larger than an initial load of the mechanical spring for the second end portion.

5. The power tool as defined in claim 2, wherein each of the first end portion and the second end portion is elastically connected to the tool body or to the outer housing via rubber or elastic synthetic resin to be movable in the first direction, the second direction and a third direction that is orthogonal to the first direction and the second direction.

6. The power tool as defined in claim 2, wherein:

the first end portion is elastically connected to the tool body or to the outer housing via a mechanical spring, and the second end portion is pivotable relative to the tool body or the outer housing around an axis extending in a third direction that is orthogonal to the first direction and the second direction.

7. A power tool having a hammer mechanism, comprising:

a motor;

a driving mechanism that is operably connected to the motor and that is configured to at least linearly drive a tool accessory along a driving axis in response to driving of the motor;

a tool body that houses the motor and the driving mechanism;

an outer housing that is elastically connected to the tool body such that the outer housing at least partially covers the tool body and that is slidable relative to the tool body in a first direction substantially parallel to the driving axis;

a guide part that is configured to guide sliding movement of the outer housing relative to the tool body, and the guide part includes (i) a body-side guide part that is provided in/on the tool body; and (ii) an outer-side guide part that is provided in/on the outer housing and that is slidable relative to the body-side guide part in the first direction; and a handle that includes a grip part extending in a second direction that intersects the first direction, wherein the handle is elastically connected at least to the outer housing and is movable relative to the outer housing in the first direction and in at least one direction that intersects the first direction, wherein the tool body and the outer housing are (i) connected via a first elastic member to be movable relative to each other in the first direction, and (ii) connected via a second elastic member that is different from the first elastic member to be movable relative to each other in the at least one direction that intersects the first direction, wherein the first elastic member is a mechanical spring, and the second elastic member is an annular member that is made of rubber or elastic synthetic resin and is disposed around a shaft extending in the first direction, wherein:

a first one of the body-side guide part and the outer-side guide part is a cover that covers an outer peripheral surface of the second elastic member, a second one of the body-side guide part and the outer-side guide part is a tubular part within which the cover is disposed to be slidable in the first direction, the second elastic member is provided integrally with the guide part and is configured to be slidable in the first direction together with the guide part, and a fourth elastic member being annular and is provided integrally around a support member and is configured to be slidable in the first direction together with the support member, the support member extending in a third direction that is orthogonal to the first direction and the second direction.

8. A power tool having a hammer mechanism, comprising:

a motor;

a driving mechanism that is operably connected to the motor and that is configured to at least linearly drive a tool accessory along a driving axis in response to driving of the motor;

a tool body that houses the motor and the driving mechanism, the tool body includes: (i) a driving-mechanism-housing part that houses the driving mechanism and that extends in a first direction along the driving axis, and (ii) a motor-housing part that is connected to the driving mechanism, that extends in a second direction and that houses the motor;

an outer housing that is elastically connected to the tool body such that the outer housing at least partially covers the tool body and that is slidable relative to the tool body in a first direction substantially parallel to the driving axis, the outer housing extends in the first direction along the driving axis and at least partially covers the driving-mechanism-housing part;

a guide part that is configured to guide sliding movement of the outer housing relative to the tool body, and the guide part includes: (i) a body-side guide part that is provided in/on the tool body; and (ii) an outer-side guide part that is provided in/on the outer housing and that is slidable relative to the body-side guide part in the first direction, wherein the body-side guide part is provided on one end of a peripheral wall of the motor-housing part in the second direction, and the outer-side guide part is provided on one end of a peripheral wall of the outer housing part in the second direction; and a handle that includes a grip part extending in a second direction that intersects the first direction, wherein the handle is elastically connected at least to the outer housing and is movable relative to the outer housing in the first direction and in at least one direction that intersects the first direction, wherein the outer housing and the handle are: (i) connected via a third elastic member to be movable relative to each other in the first direction, and (ii) connected via a fourth elastic member that is different from the third elastic member to be movable relative to each other in the at least one direction that intersects the first direction, the fourth elastic member being annular and is supported around a support member extending in a third direction that is orthogonal to the first direction and the second direction; and wherein: (i) the third elastic member is a mechanical spring, and (ii) the fourth elastic member is rubber or elastic synthetic resin, wherein:

a second elastic member is provided integrally with the guide part and is configured to be slidable in the first direction together with the guide part, and the fourth elastic member configured to be slidable in the first direction together with the support member.

* * * * *